(12) United States Patent
Kean et al.

(10) Patent No.: US 9,059,980 B2
(45) Date of Patent: Jun. 16, 2015

(54) SYSTEMS AND METHODS FOR AUTHENTICATING MOBILE DEVICES

(75) Inventors: Brian Kean, Missouri Valley, IA (US); Devin Michael Cambridge, Atlanta, GA (US)

(73) Assignee: First Data Corporation, Greenwood Village, CO (US)

( * ) Notice: Subject to any disclaimer, the term of this patent is extended or adjusted under 35 U.S.C. 154(b) by 351 days.

(21) Appl. No.: 13/481,356

(22) Filed: May 25, 2012

(65) Prior Publication Data

US 2012/0300938 A1 Nov. 29, 2012

Related U.S. Application Data

(60) Provisional application No. 61/490,501, filed on May 26, 2011.

(51) Int. Cl.
*G06Q 20/20* (2012.01)
*H04L 29/06* (2006.01)
*H04L 9/32* (2006.01)
*H04W 12/02* (2009.01)
*G06Q 40/00* (2012.01)
*H04W 4/00* (2009.01)
*G06Q 20/00* (2012.01)

(52) U.S. Cl.
CPC .............. *H04L 63/08* (2013.01); *H04L 9/3234* (2013.01); *H04L 2209/80* (2013.01); *H04L 63/061* (2013.01); *H04L 63/126* (2013.01); *H04W 4/001* (2013.01); *H04W 12/02* (2013.01); *H04L 2463/061* (2013.01); *H04L 2463/062* (2013.01); *G06Q 20/00* (2013.01); *G06Q 40/00* (2013.01)

(58) Field of Classification Search
CPC ............ H04L 2209/80; H04L 63/0428; H04L 9/0869; H04L 9/0866; H04L 63/061; H04L 2463/061; H04L 9/3224; H04L 63/08; H04L 63/126; H04L 2463/062; H04W 12/04; H04W 12/02; H04W 4/001; G06Q 40/00; G06Q 20/00
USPC .................................................. 380/277–279
See application file for complete search history.

(56) References Cited

U.S. PATENT DOCUMENTS 5,491,750 A 2/1996 Bellare et al.
6,044,350 A 3/2000 Weiant, Jr. et al.

(Continued)

OTHER PUBLICATIONS

Mid Tex Federal Credit Union, Mid-Texan 1st Quarter Newsletter, Mar. 31, 2009. See pp. 7-8 'Tellers Tips' http://www.mtfcu.org/Newsletter%202.htm.

(Continued)

*Primary Examiner* — Catherine Thiaw
(74) *Attorney, Agent, or Firm* — Sutherland Asbill & Brennan LLP

(57) ABSTRACT

Embodiments of the invention provide systems and methods for authenticating mobile devices. Device identifying information may be received for a mobile device. A base level key may also be communicated to the mobile device. The base level key may be utilized by the mobile device to derive unique transaction specific keys to encrypt subsequent communications output by the mobile device. A communication encrypted with a unique transaction specific key may be received from the mobile device. Based at least in part upon the device identifying information and the base level key, a derived key may be generated, and the derived key may be utilized to decrypt the received communication and authenticate the mobile device. In certain embodiments, the above operations may be performed by one or more computers associated with a service provider.

21 Claims, 6 Drawing Sheets

(56) References Cited

U.S. PATENT DOCUMENTS

| | | | |
|---|---|---|---|
| 6,084,969 A | 7/2000 | Wright et al. | |
| 6,163,771 A | 12/2000 | Walker et al. | |
| 6,422,462 B1 | 7/2002 | Cohen | |
| 6,931,382 B2 | 8/2005 | Laage et al. | |
| 7,213,147 B2 | 5/2007 | Tuvell et al. | |
| 7,353,388 B1* | 4/2008 | Gilman et al. | 713/168 |
| 7,548,621 B1* | 6/2009 | Smith et al. | 380/277 |
| 7,702,553 B1 | 4/2010 | Dickelman | |
| 7,702,577 B1 | 4/2010 | Dickelman | |
| 8,078,867 B2 | 12/2011 | Brown et al. | |
| 8,099,363 B1 | 1/2012 | Kilchenstein, Jr. | |
| 8,135,964 B2* | 3/2012 | Shi et al. | 713/193 |
| 8,386,381 B1 | 2/2013 | Barton et al. | |
| 8,413,894 B2 | 4/2013 | Bona et al. | |
| 8,423,548 B1 | 4/2013 | Trandal et al. | |
| 8,489,740 B2 | 7/2013 | Schneider | |
| 8,560,849 B2 | 10/2013 | Machani et al. | |
| 8,627,092 B2 | 1/2014 | Fischer et al. | |
| 8,689,012 B1 | 4/2014 | Bierbaum et al. | |
| 8,752,127 B2 | 6/2014 | Musfeldt et al. | |
| 8,775,305 B2 | 7/2014 | Pointer | |
| 8,880,886 B2 | 11/2014 | Kean et al. | |
| 2001/0029485 A1 | 10/2001 | Brody et al. | |
| 2002/0091646 A1 | 7/2002 | Lake et al. | |
| 2002/0128977 A1 | 9/2002 | Nambiar et al. | |
| 2002/0133467 A1 | 9/2002 | Hobson et al. | |
| 2002/0147658 A1* | 10/2002 | Kwan | 705/26 |
| 2002/0156689 A1 | 10/2002 | Spalding | |
| 2003/0014360 A1 | 1/2003 | Arditti et al. | |
| 2003/0023549 A1 | 1/2003 | Armes et al. | |
| 2004/0030659 A1 | 2/2004 | Gueh | |
| 2004/0031856 A1 | 2/2004 | Atsmon et al. | |
| 2004/0123102 A1 | 6/2004 | Gehrmann et al. | |
| 2004/0155101 A1 | 8/2004 | Royer et al. | |
| 2004/0159700 A1 | 8/2004 | Khan et al. | |
| 2004/0172340 A1 | 9/2004 | Bishop et al. | |
| 2005/0092839 A1 | 5/2005 | Oram | |
| 2005/0182855 A1 | 8/2005 | Apostolopoulos et al. | |
| 2005/0198506 A1 | 9/2005 | Qi et al. | |
| 2005/0221814 A1 | 10/2005 | Fagan et al. | |
| 2005/0250538 A1 | 11/2005 | Narasimhan et al. | |
| 2005/0269402 A1 | 12/2005 | Spitzer et al. | |
| 2005/0279827 A1 | 12/2005 | Mascavage et al. | |
| 2006/0000900 A1 | 1/2006 | Fernandes et al. | |
| 2006/0040642 A1* | 2/2006 | Boris et al. | 455/407 |
| 2006/0064458 A1 | 3/2006 | Gehrmann | |
| 2006/0077034 A1 | 4/2006 | Hillier | |
| 2006/0131410 A1 | 6/2006 | Fernandes et al. | |
| 2006/0179305 A1* | 8/2006 | Zhang | 713/168 |
| 2006/0206350 A1 | 9/2006 | Edwards et al. | |
| 2006/0217111 A1* | 9/2006 | Marolia et al. | 455/418 |
| 2007/0063024 A1 | 3/2007 | Guillot | |
| 2007/0091843 A1 | 4/2007 | Patel et al. | |
| 2007/0101122 A1* | 5/2007 | Guo | 713/153 |
| 2007/0180262 A1 | 8/2007 | Benson | |
| 2007/0203732 A1 | 8/2007 | Griegel et al. | |
| 2008/0008322 A1* | 1/2008 | Fontana et al. | 380/277 |
| 2008/0010217 A1 | 1/2008 | Hobson et al. | |
| 2008/0037785 A1 | 2/2008 | Gantman et al. | |
| 2008/0049940 A1* | 2/2008 | Kocher | 380/277 |
| 2008/0052183 A1 | 2/2008 | Hobson et al. | |
| 2008/0126252 A1 | 5/2008 | Katz | |
| 2008/0130902 A1 | 6/2008 | Foo Kune et al. | |
| 2008/0136592 A1 | 6/2008 | Malik et al. | |
| 2008/0141031 A1* | 6/2008 | Oba et al. | 713/170 |
| 2008/0162929 A1 | 7/2008 | Ishikawa et al. | |
| 2008/0235513 A1* | 9/2008 | Foster et al. | 713/185 |
| 2008/0257952 A1 | 10/2008 | Zandonadi | |
| 2008/0288404 A1 | 11/2008 | Pirzadeh et al. | |
| 2008/0303665 A1 | 12/2008 | Naik et al. | |
| 2008/0305772 A1 | 12/2008 | Balasubramanian et al. | |
| 2009/0006262 A1 | 1/2009 | Brown et al. | |
| 2009/0068988 A1 | 3/2009 | Cofta | |
| 2009/0074189 A1* | 3/2009 | Ryu et al. | 380/277 |
| 2009/0099961 A1 | 4/2009 | Ogilvy | |
| 2009/0108064 A1 | 4/2009 | Fernandes et al. | |
| 2009/0132424 A1 | 5/2009 | Kendrick et al. | |
| 2009/0134217 A1 | 5/2009 | Flitcroft et al. | |
| 2009/0157557 A1 | 6/2009 | Hobson et al. | |
| 2009/0164774 A1 | 6/2009 | Sherkin | |
| 2009/0173784 A1 | 7/2009 | Yang | |
| 2009/0181644 A1 | 7/2009 | Humphrey et al. | |
| 2009/0235065 A1 | 9/2009 | Nilsson et al. | |
| 2009/0248581 A1 | 10/2009 | Brown | |
| 2009/0307482 A1 | 12/2009 | McCann | |
| 2010/0005307 A1 | 1/2010 | Prashanth | |
| 2010/0106967 A1 | 4/2010 | Johansson et al. | |
| 2010/0111306 A1 | 5/2010 | Zheng et al. | |
| 2010/0116881 A1 | 5/2010 | Flood et al. | |
| 2010/0161778 A1 | 6/2010 | Guinard et al. | |
| 2010/0174649 A1 | 7/2010 | Bouchard | |
| 2010/0191966 A1 | 7/2010 | Immonen | |
| 2010/0192220 A1 | 7/2010 | Heizmann et al. | |
| 2010/0241847 A1* | 9/2010 | van der Horst et al. | 713/152 |
| 2010/0257360 A1* | 10/2010 | Bae et al. | 713/168 |
| 2010/0274691 A1 | 10/2010 | Hammad et al. | |
| 2010/0280950 A1 | 11/2010 | Faith et al. | |
| 2010/0291904 A1* | 11/2010 | Musfeldt et al. | 455/414.1 |
| 2010/0293094 A1 | 11/2010 | Kolkowitz et al. | |
| 2011/0010538 A1* | 1/2011 | Falk et al. | 713/155 |
| 2011/0047072 A1 | 2/2011 | Ciurea | |
| 2011/0047075 A1 | 2/2011 | Fourez | |
| 2011/0087547 A1 | 4/2011 | Amaro et al. | |
| 2011/0087596 A1 | 4/2011 | Dorsey | |
| 2011/0101109 A1 | 5/2011 | Bona et al. | |
| 2011/0137802 A1* | 6/2011 | Spies et al. | 705/65 |
| 2011/0154021 A1 | 6/2011 | McCann et al. | |
| 2011/0208965 A1 | 8/2011 | Machani | |
| 2011/0231270 A1 | 9/2011 | Dykes et al. | |
| 2011/0231319 A1* | 9/2011 | Bayod et al. | 705/71 |
| 2011/0238575 A1 | 9/2011 | Nightengale et al. | |
| 2011/0264567 A1 | 10/2011 | Clyne | |
| 2011/0282789 A1 | 11/2011 | Carroll et al. | |
| 2011/0288918 A1 | 11/2011 | Cervenka et al. | |
| 2011/0309309 A1 | 12/2011 | Hartmann et al. | |
| 2011/0314274 A1 | 12/2011 | Swartz | |
| 2012/0017089 A1* | 1/2012 | Kocher | 713/172 |
| 2012/0022945 A1 | 1/2012 | Falkenborg et al. | |
| 2012/0023022 A1 | 1/2012 | Carroll et al. | |
| 2012/0084806 A1* | 4/2012 | Fahrny et al. | 725/31 |
| 2012/0095857 A1 | 4/2012 | McKelvey et al. | |
| 2012/0097739 A1 | 4/2012 | Babu et al. | |
| 2012/0108295 A1 | 5/2012 | Schell et al. | |
| 2012/0109734 A1 | 5/2012 | Fordyce, III et al. | |
| 2012/0130898 A1 | 5/2012 | Snyder et al. | |
| 2012/0159105 A1 | 6/2012 | von Behren et al. | |
| 2012/0172089 A1* | 7/2012 | Bae et al. | 455/558 |
| 2012/0174189 A1 | 7/2012 | Lim et al. | |
| 2012/0190386 A1 | 7/2012 | Anderson | |
| 2012/0197802 A1 | 8/2012 | Smith et al. | |
| 2012/0203698 A1 | 8/2012 | Duncan et al. | |
| 2012/0215610 A1 | 8/2012 | Amaro et al. | |
| 2012/0239479 A1 | 9/2012 | Amaro et al. | |
| 2012/0239574 A1 | 9/2012 | Smith et al. | |
| 2012/0296741 A1 | 11/2012 | Dykes | |
| 2012/0296824 A1 | 11/2012 | Rosano | |
| 2012/0300932 A1 | 11/2012 | Cambridge et al. | |
| 2012/0303310 A1 | 11/2012 | Musfeldt | |
| 2012/0303496 A1 | 11/2012 | Musfeldt | |
| 2012/0303503 A1 | 11/2012 | Cambridge et al. | |
| 2012/0303961 A1 | 11/2012 | Kean et al. | |
| 2012/0304254 A1 | 11/2012 | Musfeldt et al. | |
| 2012/0304255 A1* | 11/2012 | Carnes | 726/3 |
| 2012/0317019 A1 | 12/2012 | Carnes | |
| 2013/0179695 A1* | 7/2013 | Zollinger et al. | 713/189 |

OTHER PUBLICATIONS

Non-final Office Action for U.S. Appl. No. 13/481,352 mailed Jun. 13, 2013.

Non-final Office Action for U.S. Appl. No. 13/481,437 mailed Sep. 9, 2013.

Non-final Office Action for U.S. Appl. No. 13/481,377 mailed Oct. 10, 2013.

(56) References Cited

OTHER PUBLICATIONS

Non-final Office Action for U.S. Appl. No. 13/481,433 mailed Oct. 23, 2013.
Final Office Action for U.S. Appl. No. 13/481,352 mailed Dec. 17, 2013.
Notice of Allowance for U.S. Appl. No. 13/481,437 mailed Dec. 26, 2013.
Notice of Allowance for U.S. Appl. No. 13/481,377 mailed Jan. 28, 2014.
Non-final Office Action for U.S. Appl. No. 13/481,387 mailed Feb. 6, 2014.
Final Office Action for U.S. Appl. No. 13/481,433 mailed Apr. 10, 2014.
Non-final Office Action for U.S. Appl. No. 13/481,394 mailed May 21, 2014.
Non-final Office Action for U.S. Appl. No. 13/481,364 mailed Jun. 4, 2014.
Final Office Action for U.S. Appl. No. 13/481,387 mailed Jun. 25, 2014.
Notice of Allowance for U.S. Appl. No. 13/481,433 mailed Jun. 30, 2014.
Non-final Office Action response for U.S. Appl. No. 13/481,352 mailed Oct. 14, 2013.
Non-final Office Action response for U.S. Appl. No. 13/481,437 mailed Nov. 20, 2013.
Non-final Office Action response for U.S. Appl. No. 13/481,377 mailed Jan. 10, 2014.
Non-final Office Action response for U.S. Appl. No. 13/481,433 mailed Jan. 23, 2014.
Final Office Action response for U.S. Appl. No. 13/481,352 mailed Mar. 4, 2014.
Advisory Action for U.S. Appl. No. 13/481,352 mailed Mar. 14, 2014.
Advisory Action response for U.S. Appl. No. 13/481,352 mailed Mar. 17, 2014.
Non-final Office Action response for U.S. Appl. No. 13/481,387 mailed Apr. 21, 2014.
Final Office Action response for U.S. Appl. No. 13/481,433 mailed Jun. 10, 2014.
Final Office Action for U.S. Appl. No. 13/481,364 mailed Nov. 24, 2014.
Non-final Office Action for U.S. Appl. No. 13/481,346 mailed Dec. 4, 2014.

* cited by examiner

SYSTEMS AND METHODS FOR AUTHENTICATING MOBILE DEVICES

RELATED APPLICATION

This application claims priority to U.S. Ser. No. 61/490,501, titled "Trusted Service Manager," filed on May 26, 2011, the contents of which are incorporated herein by reference.

FIELD OF THE INVENTION

Embodiments of the invention relate generally to mobile devices, and more specifically to systems and methods for authenticating mobile devices.

BACKGROUND OF THE INVENTION

Mobile devices, such as cell phones, personal digital assistants ("PDAs"), smart phones, and other similar devices, have increasingly been utilized to provide additional functionality beyond traditional voice communications. One component of enabling the mobile devices to support these additional functionalities includes installing software applications on the mobile devices. Mobile device applications can facilitate a variety of services performed by or with the mobile devices, including payment applications (e.g., prepaid, credit, debit, etc.), loyalty or incentive applications, transportation payment applications, access control applications, entertainment applications, and the like. Given the sensitive nature of data that may be transmitted or communicated during the provision of a service, such as a payment service, authentication of mobile devices and/or the protection of data becomes critical. Accordingly, improved systems and methods for authenticating mobile devices are desirable.

Additionally, service providers operating services associated with these applications, and thus providing the mobile device software applications, need to be able to interact with their customers regardless of the carrier network the customer uses for operating the mobile device. Accordingly, multiple service providers (e.g., card issuing banks, retailers, transit operators, etc.) need to load and manage applications (e.g., near field communication-based ("NFC-based") applications, etc.) onto mobile devices supported by multiple mobile network operators. Sharing confidential information through large numbers of individual relationships (i.e., between one service provider and one mobile network operator) is inefficient, requiring complex integration by the service providers for each mobile network operator supported, and by the mobile network operators for each service provider installing applications. Accordingly, there exists a need for providing trusted service management functionality and integration between multiple service providers and multiple mobile network operators. Additionally, there exists a need for a trusted service management system to authenticate mobile devices.

BRIEF DESCRIPTION OF THE INVENTION

Embodiments of the invention may provide systems and methods for authenticating mobile devices. According to one example embodiment of the invention, a method for authenticating mobile devices is provided. Device identifying information may be received for a mobile device. A base level key may also be communicated to the mobile device. The base level key may be utilized by the mobile device to derive unique transaction specific keys to encrypt subsequent communications output by the mobile device. A communication encrypted with a unique transaction specific key may be received from the mobile device. Based at least in part upon the device identifying information and the base level key, a derived key may be generated, and the derived key may be utilized to decrypt the received communication and authenticate the mobile device. In certain embodiments, the above operations may be performed by one or more computers associated with a service provider.

According to another embodiment, a system for authenticating mobile devices may be provided. The system may include at least one memory and at least one processor. The at least one memory may be configured to store computer-executable instructions. The at least one processor may be configured to access the at least one memory and execute the computer-executable instructions to: receive, from a mobile device, device identifying information for the mobile device; direct communication, to the mobile device, of a base level key utilized by the mobile device to derive unique transaction specific keys to encrypt subsequent communications output by the mobile device; receive, from the mobile device, a communication encrypted with a unique transaction specific key; generate, based at least in part upon the device identifying information and the base level key, a derived key; and utilize the derived key to decrypt the received communication and authenticate the mobile device.

According to yet another embodiment of the invention, a method for authenticating a mobile device may be provided. Device identifying information for a mobile device may be communicated by the mobile device to a service provider. A base level key may be received by the mobile device from the service provider. The base level key may be utilized by the mobile device to derive a unique transaction specific key. Utilizing the derived unique transaction specific key, a communication may be encrypted by the mobile device, and the encrypted communication may be output by the mobile device to the service provider. The service provider may utilize the device identifying information and the base level key to generate a key to decrypt the communication and authenticate the mobile device.

Additional systems, methods, apparatus, features, and aspects are realized through the techniques of various embodiments of the invention. Other embodiments and aspects of the invention are described in detail herein and are considered a part of the claimed invention. Other advantages and features can be understood with reference to the description and to the drawings.

DETAILED DESCRIPTION

Figure 1:
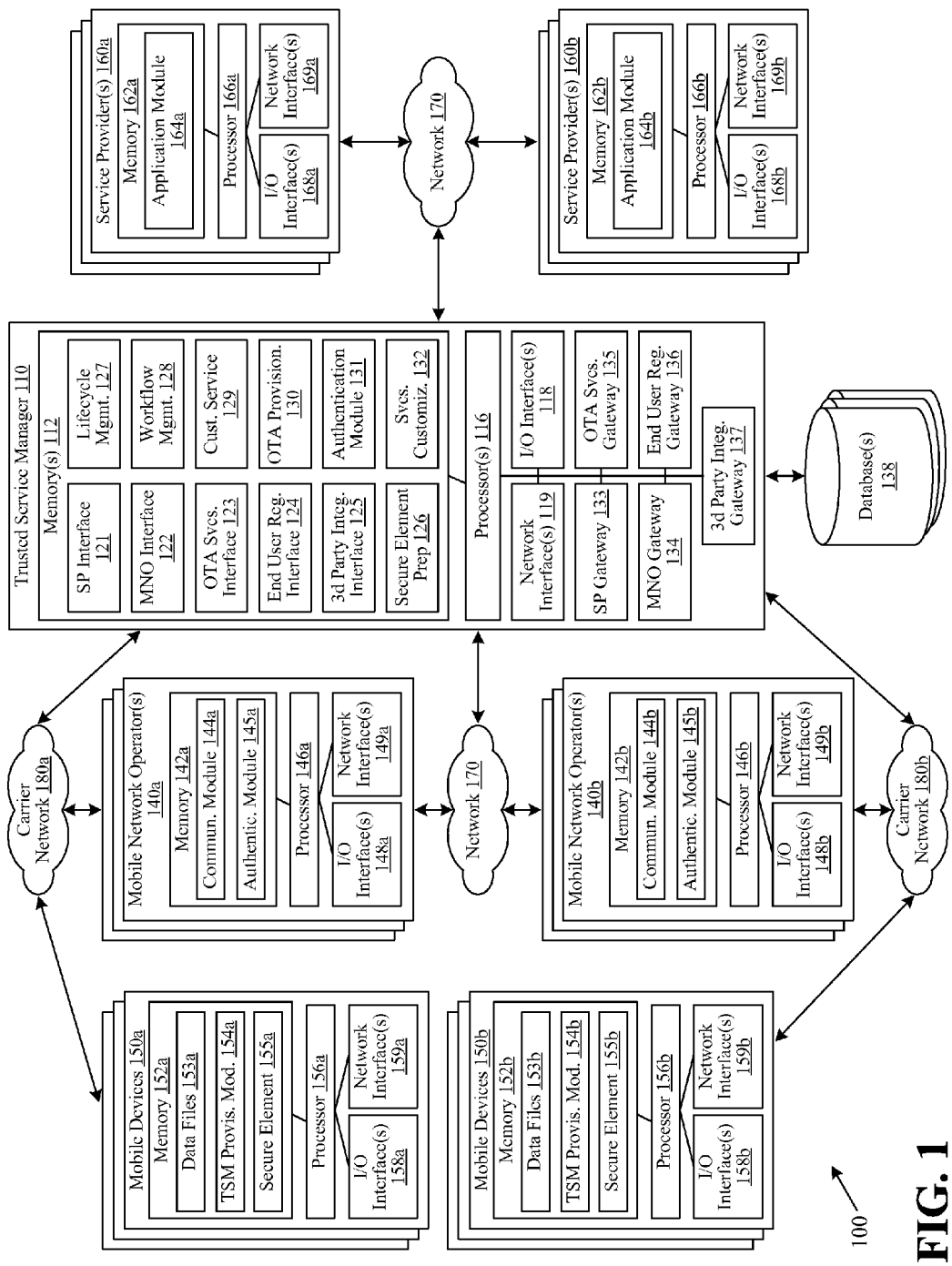
FIG. 1 illustrates a block diagram of an example trusted service management system and associated integration, according to an example embodiment of the invention.

Various embodiments of the invention are directed to authenticating mobile devices and/or communications between one or more service providers and mobile devices. In certain embodiments, a mobile device may be provisioned with a base level key or super-secret key and an application or program module configured to derive unique transaction specific keys. For example, during a registration of the mobile device with a trusted service manager ("TSM"), the mobile device may be provisioned. Additionally, device identifying information, such as card production life cycle ("CPLC") information and/or identifying information associated with a secure element, may be received from the device. According to an aspect of the invention, the base level key and at least a portion of the device identifying information may be utilized to generate or derive transaction specific keys that may be utilized to authenticate subsequent communications received from and/or transmitted to the mobile device. In this regard, the mobile device may be authenticated in a relatively secure manner.

A wide variety of suitable methods and/or techniques may be utilized as desired to generate transaction specific keys. For example, in certain embodiments, a base level key may be combined with at least a portion of the device identifying information to derive an intermediate key. The intermediate key may be provided to a derived unique key per transaction ("DUKPT") process to generate a plurality of transaction specific keys. For example, the intermediate key may be provided to a DUKPT process that is executed by an authentication application or module that has been provisioned on the mobile device. Similarly, a service provider may utilize the device identifying information and the base level key to derive transaction specific keys.

During a subsequent communication between the mobile device and the service provider, a transaction specific key may be utilized to encrypt the communication. For example, a transaction specific key may be selected and utilized by the mobile device to encrypt a payment transaction request. Once the encrypted communication is communicated to the service provider, the service provider may utilize an independently generated transaction specific key to decrypt the communication and authenticate the mobile device. In certain embodiments, both the mobile device and the service provider may cycle through generated transaction specific keys and a next available key may be utilized for each communication. In other embodiments, an identifier of a transaction specific key, such as a number associated with a key, may be included in a communication, and the recipient device may utilize the identifier to select an appropriate transaction specific key for decryption.

As desired in various embodiments, transaction specific keys may be utilized for a wide variety of different purposes and/or in association with a wide variety of different mobile device communications. For example, transaction specific keys may be utilized to encrypt secure messages. As another example, transaction specific keys may be utilized to authenticate a mobile device during the establishment of a secure communications channel, such as a secure socket layer ("SSL") communications channel. As a result of utilizing transaction specific keys for authentication, a higher level of security may be provided. For example, if a transaction specific key is compromised, future and past transaction data is still protected because the future and past transactions utilized different keys.

Various embodiments of the invention utilize trusted service management functionality to facilitate integration between multiple service providers and multiple mobile devices operating on any number of carrier networks, each operated by a different mobile network operator ("MNO"). In certain embodiments, a trusted service manager ("TSM") may be a third party entity strategically positioned to provide mobile device application provisioning services and integration functionality for provisioning mobile device applications and associated end user data to end users' mobile devices, to provide mobile device application-related lifecycle management services, to manage the many-to-many relationships between the multiple service providers and the MNOs operating the carrier networks, and/or to authenticate mobile devices during a wide variety of different transactions.

Applications that can be provisioned on mobile devices via a TSM can be any software application provided by a service provider and operable with a mobile device. According to one embodiment, near field communication ("NFC") applications that enable subsequent transactions using NFC technology of the mobile device (e.g., radio frequency identification ("RFID")) are among those mobile device applications provided by service providers. However, as used herein, mobile device applications are not limited to NFC-based applications. Example mobile device applications may include, but are not limited to, open loop and closed loop payment applications (e.g., MasterCard® PayPass™, Visa payWave™, American Express® ExpressPay, Discover® ZIP, NXP Mifare®, etc.), transit payment applications, loyalty applications, membership applications, electronic promotion and incentive applications, ticketing applications, access control and security applications, entertainment applications, retail shopping applications, and the like.

In addition to providing integration and mobile device application provisioning functionality, a TSM may be further operable to provide additional features and functionality associated with each application provisioned and with each service provider, MNO, and/or mobile device end user relationship. Example additional features that a TSM may provide include, but are not limited to, application lifecycle management (e.g., load, personalize, lock, unlock, terminate, etc.), secure element lifecycle management (e.g., lock, unlock, terminate, etc.), workflow management (e.g., new handset, exchanged handset, damaged handset, lost handset, stolen handset, closed MNO account, closed service provider account, etc.), secure element data preparation and application personalization, MNO customer service, service provider customer service, over the air ("OTA") provisioning, secured key management, end user authentication, MNO-based end user registration, carrier network-based end user registration, service provider-based end user registration, interactive voice response-based ("IVR-based") end user registration, live end user registration, and the like. It is appreciated that the aforementioned additional TSM features and functionality are provided for illustrative purposes only, and that any number of features and functionality may be provided by the TSM to service providers, MNOs, and/or end users in association with the application provisioning services and functionality.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

FIG. 1 represents a block diagram of an example system 100 for providing trusted service management functionality, according to one embodiment of the invention. As shown in FIG. 1, a trusted service manager ("TSM") computer 110; multiple mobile network operator ("MNO") computers 140a, 140b; multiple mobile devices 150a, 150b; and multiple service provider computers 160a, 160b may be in communication via at least one network 170 and/or multiple carrier networks 180a, 180b, each of the carrier networks 180a, 180b being associated with a respective MNO computer 140a, 140b. Each of these components will now be discussed in further detail.

First, the TSM computer 110 may include any number of processor-driven devices including, but not limited to, a server computer, a mainframe computer, one or more networked computers, a desktop computer, a personal computer, a laptop computer, a mobile computer, or any other processor-based device. In addition to having one or more processors 116, the TSM computer 110 may further include one or more memory devices 112, input/output ("I/O") interface(s) 118, and network interface(s) 119. The memory 112 may be any computer-readable medium, coupled to the processor(s) 116, such as RAM, ROM, and/or a removable storage device for storing data files and a database management system ("DBMS") to facilitate management of data files and other data stored in the memory 112 and/or stored in one or more separate databases 138. The memory 112 may also store various program modules, such as an operating system ("OS"), a service provider interface 121, a mobile network operator interface 122, an over the air (OTA) services interface 123, an end user registration interface 124, a third party integrator interface 125, a secure element preparation module 126, a lifecycle management module 127, a workflow management module 128, a customer service module 129, an over the air provisioning module 130, an authentication module 131, and a services customization module 132. The OS may be, but is not limited to, Microsoft Windows®, Apple OSX™, Unix, a mainframe computer operating system (e.g., IBM z/OS, MVS, OS/390, etc.), or a specially designed operating system. Each of the interfaces and modules 121, 122, 123, 124, 125, 126, 127, 128, 129, 130, 131, 132 may comprise computer-executable program instructions or software, including a dedicated program, for receiving, storing, extracting, managing, processing, and analyzing transactions associated with application provisioning, lifecycle management, and/or authentication between multiple service provider computers 160a, 160b and multiple mobile devices 150a, 150b operating on multiple carrier networks 180a, 180b, each of which are operated by a different MNO computer 140a, 140b. The specific functions and operability of each of these interfaces and modules 121, 122, 123, 124, 125, 126, 127, 128, 129, 130, 131, 132 are described in greater detail below.

Still referring to the TSM computer 110, the I/O interface(s) 118 may facilitate communication between the processor 116 and various I/O devices, such as a keyboard, mouse, printer, microphone, speaker, monitor, bar code reader/scanner, RFID reader, or Hardware Security Modules ("HSMs") which facilitate secure key management and the like. With respect to HSMs, an HSM may be external, such as connected to the TSM computer 110 via a network, or internally or proximately connected to the TSM computer 110. The network interface(s) 119 may take any of a number of forms, such as, but not limited to, a network interface card, a modem, a wireless network card, a cellular network card, or any other means operable for facilitating communications with one or more carrier networks 180a, 180b and/or other networks 170. Indeed, the TSM computer 110 can communicate directly with mobile devices 150a, 150b via the carrier networks 180a, 180b, respectively, via network interface(s) 119 and/or via one or more of a service provider gateway 133, mobile network operator gateway 134, over the air services gateway 135, end user registration gateway 136, and third party integrator gateway 137. It will be appreciated that the TSM computer 110 may be implemented on a particular machine, which may include a computer that is designed, customized, configured, or programmed to perform at least one or more functions of the interfaces and modules 121, 122, 123, 124, 125, 126, 127, 128, 129, 130, 131, 132, according to an example embodiment of the invention.

Second, the MNO computers 140a, 140b may include any number of processor-driven devices including, but not limited to, a server computer, a mainframe computer, one or more networked computers, a desktop computer, a personal computer, a laptop computer, a mobile computer, or any other processor-based device. In addition to having one or more processors 146a, 146b, each of the MNO computers 140a, 140b may further include one or more memory devices 142a, 142b, input/output ("I/O") interface(s) 148a, 148b, and network interface(s) 149a, 149b. The memory 142a, 142b may be any computer-readable medium, coupled to the processor(s) 146, such as RAM, ROM, and/or a removable storage device for storing data files and a DBMS to facilitate management of data files and other data stored in the memory 142a, 142b and/or stored in one or more separate databases. The memory 142a, 142b may also store various program modules, such as an operating system ("OS"), a communications module 144a, 144b, and an authentication module 145a, 145b. The OS may be, but is not limited to, Microsoft Windows®, Apple OSX™, Unix, a mainframe computer operating system (e.g., IBM z/OS, MVS, OS/390, etc.), or a specially designed operating system. The communications module 144a, 144b may comprise computer-executable program instructions or software, including a dedicated program, for facilitating communications with multiple mobile devices 150a, 150b operating on the respective carrier networks 180a, 180b, and for facilitating mobile device application provisioning and management via a common MNO messaging standard as implemented by the TSM computer 110. The authentication module 145a, 145b may comprise computer-executable program instructions or software, including a dedicated program, for facilitating the authentication of mobile devices 150a, 150b and/or the establishment of secure communications channels with mobile devices 150a, 150b. A wide variety of authentication procedures may be utilized as desired by an authentication module 145a, 145b. In certain embodiments of the invention, an MNO computer 140a, 140b may authenticate a mobile device 150a, 150b in a similar manner as the TSM 110.

Still referring to each MNO computer 140a, 140b, the I/O interface(s) 148a, 148b may facilitate communication between the processors 146a, 146b and various I/O devices, such as a keyboard, mouse, printer, microphone, speaker, monitor, bar code reader/scanner, RFID reader, and the like. The network interface(s) 149a, 149b may take any of a number of forms, such as, but not limited to, a network interface card, a modem, a wireless network card, a cellular network card, or any other means operable for facilitating communications with one or more carrier networks 180a, 180b and/or other network 170. It will be appreciated that the MNO computers 140a, 140b may be implemented on a particular machine, which may include a computer that is designed, customized, configured, or programmed to perform at least one or more functions of the communications module 144a, 144b, according to an example embodiment of the invention.

Third, the mobile devices 150a, 150b may be any mobile processor-driven device, such as a mobile phone, radio, pager, laptop computer, handheld computer, PDA, and the like, or any other processor-based mobile device for facilitating communications over one or more carrier networks 180a, 180b. For example, each mobile device 150a, 150b may be registered with a specific MNO computer 140a, 140b for communicating via the respective carrier network 180a, 180b. In addition to having one or more processors 156a, 156b, each of the mobile devices 150a, 150b may further include one or more memory devices 152a, 152b, input/output ("I/O") interface(s) 158a, 158b, and network interface(s) 159a, 159b. The memory 152a, 152b may be any computer-readable medium, coupled to the processor(s) 156, such as RAM, ROM, and/or a removable storage device for storing data files. The memory 152a, 152b may also include secure elements 155a, 155b for maintaining mobile device applications and confidential data offered by one or more service provider computers 160, as may be provisioned via the TSM computer 110 and associated provisioning services. In certain embodiments, a secure element 155a, 155b may store an authentication module or program utilized by a mobile device 150a, 150b to generate transaction specific keys, encrypt communications output by the mobile device 150a, 150b, and/or decrypt communications received by the mobile device 150a, 150b. One example of the operations that may be performed by a mobile device authentication module is described in greater detail below with reference to FIGS. 3-5.

The memory 152a, 152b may also store any number of data files 153a, 153b and/or various program modules, such as an operating system ("OS"), end user interface module(s), and a TSM provisioning module 154a, 154b (also referred to interchangeably herein as "TSM administration software"). The OS may be any mobile operating system, including proprietary operating systems by a mobile device manufacturer or mobile network operator, or third party software vendor mobile operating system, such as, but not limited to, Microsoft Windows CE®, Microsoft Windows Mobile®, Symbian OS™, Apple iPhone™ OS, RIM BlackBerry® OS, Palm OS® by ACCESS, or Google Android™. The TSM provisioning module 154a, 154b may comprise computer-executable program instructions or software, including a dedicated program, for facilitating mobile device application provisioning on general memory and/or on the secure elements 155a, 155b as carried out by the TSM computer 110. According to various embodiments, the secure elements 155a, 155b may refer to any computer-readable storage in the memory 152 and/or may refer to any securitized medium having memory, such as a Universal Integrated Circuit Card ("UICC"), Subscriber Identity Module ("SIM"), and the like. In one example, the secure elements 155a, 155b may be operable with a RFID device or other NFC device associated with the mobile devices 150a, 150b. It is also appreciated that the secure elements 155a, 155b may be a separate embedded secure element (e.g., smart card chip) or a separate element (e.g., removable memory card, a key fob; connected via Bluetooth, etc.). For example, a secure element chip may be embedded in a mobile device 150a, 150b separately from a general operation chip utilized by the mobile device 150a, 150b. In certain embodiments, the secure elements 155a, 155b may include any suitable hardware and/or software, such as memory, processing components, and communications components. In certain embodiments, the secure elements 155a, 155b may be configured to communicate with other elements of the mobile devices 150a, 150b, such as a general or shared memory chip associated with the mobile devices 150a, 150b. For example, a mobile wallet may be stored in shared memory, and a secure element 155a, 155b may be accessed to encrypt and/or decrypt transactions generated by and/or received by the mobile wallet.

Still referring to each mobile device 150a, 150b, the I/O interface(s) 158a, 158b may facilitate communication between the processors 156a, 156b and various I/O devices, such as a keypad, touch screen, keyboard, mouse, printer, microphone, speaker, screen display, RFID device, NFC device, and the like. The network interface(s) 159a, 159b may take any of a number of forms to permit wireless communications according to various communications standards, such as, but not limited to, Code Division Multiple Access ("CDMA"), Global System for Mobile Communication ("GSM"), Universal Wireless Communications ("UWC"), Universal Mobile Telecommunications System ("UMTS"), or General Packet Radio Service ("GPRS") communications standards as may be implemented by one or more carrier networks 180a, 180b. The network interfaces(s) 159a, 159b may further permit access to other networks 170, such as via one or more carrier networks 180a, 180b providing Internet or other network access, or via Wi-Fi communications onto a Wi-Fi network. It will be appreciated that the mobile devices 150a, 150b may be implemented on a particular machine, which may include a computer that is designed, customized, configured, or programmed to perform at least one or more functions of the TSM provisioning module 154a, 154b and other mobile communications, including voice communications, data communications, short message service ("SMS"), wireless application protocol ("WAP"), multimedia message service ("MMS"), Internet communications, other wireless communications, and the like, according to an example embodiment of the invention.

Fourth, the service provider ("SP") computers 160a, 160b may include any number of processor-driven devices, including but not limited to, a server computer, a mainframe computer, one or more networked computers, a desktop computer, a personal computer, a laptop computer, a mobile computer, or any other processor-based device. In addition to having one or more processors 166a, 166b, each of the service provider computers 160a, 160b may further include one or more memory devices 162a, 162b, input/output ("I/O") interface(s) 168a, 168b, and network interface(s) 169a, 169b. The memory 162a, 162b may be any computer-readable medium, coupled to the processor(s) 166, such as RAM, ROM, and/or a removable storage device for storing data files and a DBMS to facilitate management of data files and other data stored in the memory 162a, 162b and/or stored in one or more separate databases. The memory 162a, 162b may also store various program modules, such as an operating system ("OS") and a mobile device application module 164a, 164b. The OS may be, but is not limited to, Microsoft Windows®, Apple OSX™, Unix, a mainframe computer operating system (e.g., IBM z/OS, MVS, OS/390, etc.), or a specially designed operating system. The mobile device application module 164a, 164b may comprise computer-executable program instructions or software, including a dedicated program, for generating and/or providing mobile device software applications for provisioning on multiple mobile devices 150a, 150b via a common service provider messaging standard as implemented by the TSM computer 110.

Still referring to each service provider computer 160a, 160b, the I/O interface(s) 168a, 168b may facilitate communication between the processors 166a, 166b and various I/O devices, such as a keyboard, mouse, printer, microphone, speaker, monitor, bar code reader/scanner, RFID reader, and the like. The network interface(s) 169a, 169b may take any of a number of forms, such as, but not limited to, a network interface card, a modem, a wireless network card, a cellular network card, or any other means operable for facilitating communications with the network 170. It will be appreciated that the service provider computer 160a, 160b may be implemented on a particular machine, which may include a computer that is designed, customized, configured, or programmed to perform at least one or more functions of the mobile device application module 164a, 164b, according to an example embodiment of the invention.

The network 170 may include any telecommunication and/or data network, whether public, private, or a combination thereof, including a local area network, a wide area network, an intranet, an internet, the Internet, intermediate handheld data transfer devices, a publicly switched telephone network ("PSTN"), a cellular network, and/or any combination thereof and may be wired and/or wireless. The network 170 may also allow for real time, near real time, off-line, and/or batch transactions to be transmitted between or among the TSM computer 110, the MNO computer(s) 140a, 140b, the mobile devices 150a, 150b, and the service provider computers 160a, 160b. Due to network connectivity, various methodologies as described herein may be practiced in the context of distributed computing environments. It will also be appreciated that the network 170 may include a plurality of networks, each with devices such as gateways and routers for providing connectivity between or among networks 170. Instead of, or in addition to, a network 170, dedicated communication links may be used to connect the various devices in accordance with an example embodiment.

The mobile carrier networks 180a, 180b may include any cellular telecommunication network, each operated by a respective mobile network operator. The mobile carrier networks may be implemented to operate according to one or more wireless technology formats, including, but not limited to, CDMA, GSM, UWC, UMTS, GPRS, and/or any "generation" or version thereof. Accordingly, in one embodiment, each mobile device 150a, 150b is configured to operate primarily on a certain carrier network 180a, 180b as operated by the mobile network operator with which the mobile device end user has an agreement and with which the mobile device is registered. It is appreciated, however, that, according to various embodiments, mobile devices 150a, 150b and carrier networks 180a, 180b may be configured to permit interoperability of mobile devices on non-registered carrier networks 180a, 180b.

Generally, each of the memories and data storage devices, such as the memories 112, 142a, 142b, 152a, 152b, 162a, 162b and the databases 138, and/or any other memory and data storage device, can store data and information for subsequent retrieval. In this manner, the system 100 can store various received or collected information in memory or a database associated with one or more of the TSM computer(s) 110, the MNO computer(s) 140a, 140b, the mobile devices 150a, 150b, and/or the service provider computer(s) 160a, 160b. The memories and databases can be in communication with each other and/or other databases, such as a centralized database, or other types of data storage devices. When needed, data or information stored in a memory or a database may be transmitted to a centralized database capable of receiving data, information, or data records from more than one database or other data storage devices. In other embodiments, the databases shown can be integrated or distributed into any number of databases or other data storage devices.

Suitable processors, such as the processors 116, 146a, 146b, 156a, 156b, 166a, 166b, may comprise a microprocessor, an application-specific integrated circuit ("ASIC"), and/or state machine. Example processors can be those provided by Intel Corporation (Santa Clara, Calif.), AMD Corporation (Sunnyvale, Calif.), and Motorola Corporation (Schaumburg, Ill.). According to various embodiments, one or more of the computers can be configured as a multi-processor computer having multiple processors 116, 146a, 146b, 156a, 156b, 166a, 166b providing parallel and/or redundant processing capabilities. Such processors comprise, or may be in communication with, media, for example, computer-readable media, which stores instructions that, when executed by the processor, cause the processor to perform the elements described herein. Embodiments of computer-readable media include, but are not limited to, an electronic, optical, magnetic, or other storage or transmission device capable of providing a processor with computer-readable instructions. Other examples of suitable media include, but are not limited to, a floppy disk, pen drive, CD-ROM, DVD, magnetic disk, memory chip, ROM, RAM, EPROM, EEPROM, a configured processor, all optical media, all magnetic tape or other magnetic media, or any other medium from which a computer processor can read instructions. Also, various other forms of computer-readable media may transmit or carry instructions to a computer, including a router, gateway, private or public network, or other transmission device or channel, both wired and wireless. The instructions may comprise code from any computer-programming language including, but not limited to, assembly, C, C++, C#, Visual Basic, Java, Python, Perl, JavaScript, GPSS, LISP, SAS, Parlay, JAIN, or Open Mobile Architecture.

The system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1. In addition, the designation of system components by "a" and "b" is not intended to limit the number of possible components, but instead are provided for illustrative purposes to indicate that more than one of the respective components can be provided. Accordingly, embodiments of the invention should not be construed as being limited to any particular operating environment, system architecture, or device configuration.

Figure 2:
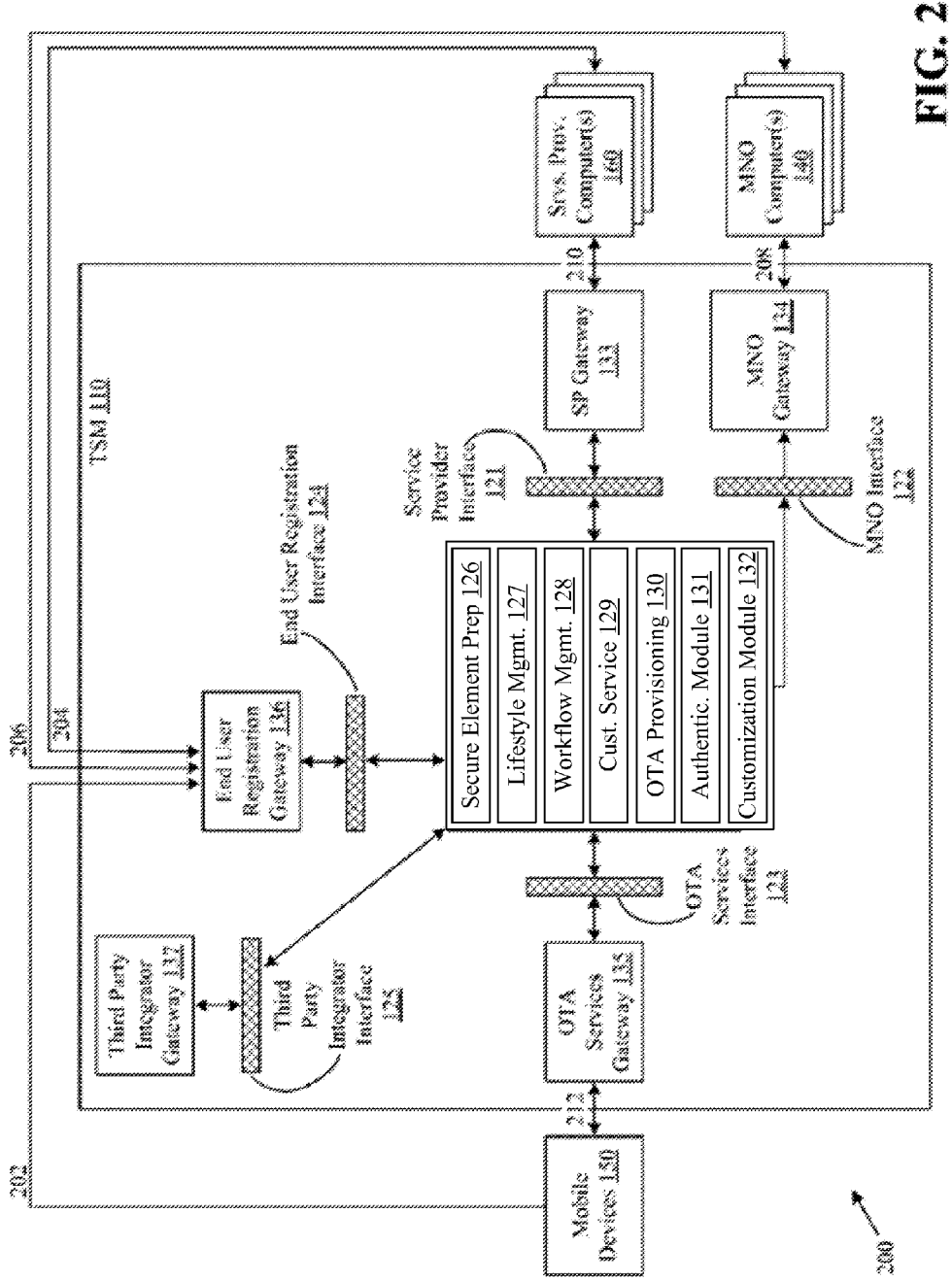
FIG. 2 illustrates a block diagram of an example trusted service management integration and associated data flow, according to an example embodiment of the invention.

FIG. 2 illustrates an example block diagram 200 illustrating data flow and integration points between the TSM computer 110 and the various other entities that may participate in mobile device application provisioning, integration, authentication, and maintenance, such as multiple service provider computers 160, multiple MNO computers 140, and multiple mobile devices 150, according to one embodiment of the invention. An example operation of the block diagram 200 of FIG. 2 will be described separately and in conjunction with the flow diagrams of FIGS. 3-6.

As generally described above, a TSM and associated TSM computer 110 may be operable to load, delete, and manage mobile device applications and associated end user data on mobile devices on behalf of multiple service providers. Additionally, the TSM computer 110 may be operable to facilitate the authentication of mobile devices. According to various embodiments, the TSM computer 110 may be operable to provide, but is not limited to, one or more of the following functions: to act as a single point of integration between service providers, MNOs, and other TSMs; to load mobile device applications over the air to mobile devices; to accept, prepare and personalize mobile device application end user data; to allow service providers to interact with end users over one or more of the carrier networks for registration and communications; to enable a service provider to authenticate the end user requesting personalization of an application; to manage secured keys (e.g., cryptographic keys, master keys, private keys, transaction specific keys, etc.) used for application provisioning, personalization, and/or authentication of mobile devices; to manage mobile device application lifecycles on behalf of service providers over the life of an application; to manage mobile device lifecycles on behalf of MNOs over the life of a handset; and to provide billing and other administration functions to support relationships between MNOs and service providers, and between the TSM and each MNO and service provider.

Various services provided by the TSM computer 110 can be implemented by one or more of the following application modules: the secure element preparation module 126, the lifecycle management module 127, the workflow management module 128, the customer service module 129, the over the air provisioning module 130, the authentication module 131, and the customization module 132.

The secure element preparation module 126 may be configured to facilitate preparing mobile device secure elements, such as requesting increased space allocated on the secure element for provisioning applications and verifying secure element properties with the MNO. According to various embodiments, the secure element preparation module 126 may further be configured to receive and/or provide personalization data associated with mobile device applications for each end user during provisioning. In one example, a service provider computer 160 may provide personalization data via the service provider gateway 133. As another example, the TSM computer 110 may generate personalization data via the secure element preparation module 126. As yet another example, the TSM computer 110 may coordinate application personalization and/or secure element preparation via one or more third entities.

The lifecycle management module 127 may be configured to facilitate tracking the status of users' mobile devices and the status of previously provisioned applications. For example, the lifecycle management module 127 may be configured to maintain inventories of various types of mobile devices, associated secure elements and the state of the secure elements and applications (active, locked, unlocked, terminated), which may be used to track the status of applications and mobile devices and to communicate with MNOs and/or service providers regarding the provisioned applications, the mobile devices, the end users, etc. In addition, the lifecycle management module 127 may be configured to coordinate initial application requests, application personalization, secure element preparation, and provisioning; coordinate any third party entities participating in the provisioning process; maintain statuses; and facilitate billing and payment (e.g., MNO fees, service provider payments, etc.).

The workflow management module 128 may be configured to maintain and manage the workflow of events between MNOs and service providers. For example, when the MNO reports a lost or stolen handset to the TSM, the TSM may trigger a series of events to the service providers to prevent fraudulent transactions. In turn, the workflow management module 128, based on service provider rules, may instruct the lifecycle management module 127 to send one or more commands to the mobile device to lock or terminate applications.

The customer service module 129 may be configured to receive and respond to customer service requests, including those from end users, service providers, and/or MNOs. According to one embodiment, the TSM computer 110 and associated customer service module 129 may provide triage and management functions between the various responsible entities (e.g., service providers and MNOs), and/or provide initial or more involved levels of customer service.

The over the air provisioning module 130 may be configured to facilitate the OTA provisioning of mobile device applications and associated end user data with multiple mobile devices. As described in more detail herein, the OTA provisioning module 130 may facilitate communications with third party OTA provisioning providers via the OTA services gateway 135, and/or can facilitate direct provisioning by the TSM computer 110. It is appreciated that, according to some embodiments, the functions of the OTA provisioning module 130 may also be implemented in one or more of the MNO computers 140 and/or within functions implemented by the carrier networks 180a, 180b, either instead of, or in combination with, those provided in the TSM computer 110 via the OTA provisioning module 130.

The authentication module 131 may be configured to provide administration and maintenance functions for secured keys (e.g., cryptographic keys, master keys, public keys, private keys, etc.) in accordance with TSM security policies, MNO security policies, and/or service provider security policies. Various functions performed by the TSM computer 110 may integrate with the authentication module 131 to provide security for end users, MNOs, and service providers in association with each of the TSM services.

According to an aspect of the invention, the authentication module 131 may be configured to format transaction specific key generation information, such as an authentication module and/or a base level key, for communication to a mobile device and/or provisioning on a secure element associated with the mobile device. In this regard, the mobile device may be configured to generate transaction specific keys that may be utilized to encrypt communications output by the mobile device. Additionally, the mobile device may utilize transaction specific keys to decrypt communications received by the mobile device from the TSM computer 110.

In addition to providing key generation information to a mobile device, the authentication module 131 may be configured to receive and direct the storage of mobile device identification information, such as CPLC information and/or information associated with a secure element of the mobile device. The authentication module 131 may utilize the mobile device identification information to generate transaction specific keys that may be utilized to authenticate the mobile device, decrypt communications received from the mobile device, and/or encrypt communications transmitted to the mobile device.

The customization module 132 may be configured to facilitate customization and selection of services offered by the TSM to each service provider and MNO. As is apparent by that described and illustrated herein, the TSM computer 110 may be configured to provide a variety of features and functions associated with mobile device application provisioning and integration between the service providers and MNOs. Accordingly, due at least in part to the simplified common interfaces and gateways (e.g., MNO gateway 134 and MNO interface 122, service provider gateway 133 and service provider interface 121, etc.), the TSM computer 110 may permit each service provider and MNO to customize from the services available. The customization module 132 may be configured to include computer-executable program logic to generate an interface for selecting and customizing TSM services, and to coordinate the implementation by other TSM application modules. For example, a first service provider may opt to only provide mobile device applications to mobile devices operating on certain carrier networks, while a second service provider may opt to provide mobile device applications to all mobile devices irrespective of the associated carrier networks. As another example, a service provider may request the TSM computer 110 to provide end user registration functionality on behalf of the service provider, while a second service provider provides its own registration services and integrates via the end user registration gateway 136 and associated end user registration interface 124. Accordingly, the customization module 132 may permit coordinating and implementing the appropriate combination of features and integration points as requested by service providers and MNOs. It is appreciated that any combination of features and integration points may be provided by the TSM computer 110, and that these are provided for illustrative purposes only. In one implementation, the customizations provided may be driven at least in part by contractual relationships between the TSM and respective service providers and MNOs, such that the TSM may also support and/or enforce these contractual agreements as part of the features of the customization module 132.

The MNOs and associated MNO computers 140 may be operable to provide the communications channel to reach and provision mobile device applications and associated end user data on end users' mobile devices. According to various embodiments, each MNO computer 140 may be operable to provide, but is not limited to, one or more of the following functions: provide the TSM computer with information on mobile device secure elements and unique mobile device identity modules (e.g., Universal Subscriber Identity Modules ("USIMs")) throughout the lifecycle; provide a communications gateway via a respective carrier network for OTA provisioning of mobile device applications; provide a mobile device user interface for accessing provisioned mobile device applications on each mobile device (e.g., a mobile wallet); facilitate management of secured keys used to securely load and delete mobile device applications on mobile device secure elements; interface with the TSM computer; facilitate authentication of the end user interfacing with the TSM; facilitate allocating memory for mobile device applications on the end users' mobile devices; communicate to the TSM computer that unique end user identity modules have changed; communicate to the TSM computer the status of unique mobile device identity modules (e.g., which USIMs have been lost, stolen, damaged, replaced by new mobile devices, etc.); and facilitate management of any tariffs and fees associated with application provisioning communications.

An MNO gateway 134 and associated MNO interface 122 are operable for providing a common point of integration between the TSM computer 110 and the multiple MNO computers 140. According to one embodiment, the MNO interface 122 is configured to communicate with each MNO according to the same common MNO message standard, as described further herein. Moreover, according to various embodiments, the MNO gateway 134 and associated MNO interface 122 are further operable to permit the TSM computer 110 to communicate with mobile devices 150 via a respective carrier network operated by each MNO.

The service providers and associated service provider computers 160 are operable to provide one or more services in which mobile device end users participate (e.g., financial services, membership services, loyalty account services, etc.). Accordingly, the service providers represent the entities that generate and/or provide mobile device applications associated with these services that are provisioned via the TSM computer 110 on end users' mobile devices. A service provider generating and providing the mobile device applications may be the same service provider that operates the underlying service, or may be a service provider providing the mobile device applications on behalf of another service provider operating the underlying service. According to various embodiments, each service provider computer 160 may be operable to provide, but is not limited to, one or more of the following functions: supply a mobile device application for loading onto the mobile devices of its end users (e.g., customers of the service provider); request the use of and/or provisioning of TSM-created soft-card applications (e.g., electronic application permitting payment or other features that can be used in association with participating service provider transactions); facilitate end user authentication processes and associated information; facilitate the creation and maintenance of end user application accounts (e.g., financial account if the service provider is a financial institution or payment processor, membership or loyalty account if the service provider is a retailer or other merchant, etc.); provide end user support for their provisioned mobile device applications; receive application messages from mobile devices returned via one or more of the carrier networks; facilitate processing contactless transactions associated with the provisioned mobile device applications (e.g., a payment transaction at a retailer, etc.); facilitate management and maintenance of application-related secured keys and share these keys with the TSM computer; and facilitate mobile device application personalization and/or coordinate with TSM to prepare personalization data.

A service provider gateway 133 and associated service provider interface 121 are operable for providing a common point of integration between the TSM computer 110 and the multiple service provider computers 160. According to one embodiment, the service provider interface 121 is configured to communicate with each service provider according to the same common service provider messaging standard, as described further herein.

The mobile devices 150 represent the respective end users that have contractual relationships with the MNOs (e.g., for operating on a respective carrier network) and with the service providers (e.g., for participating in one or more services offered by the service providers). Accordingly, end users may utilize the mobile devices 150 to register for, request, and activate mobile device applications from service providers via the TSM computer 110. According to various embodiments, each mobile device 150 may be operable to provide, but is not limited to, one or more of the following functions: activate mobile devices and/or secure elements with an MNO; register for and request mobile device applications from a service provider (or agent of the service provider) or from an MNO; download mobile device applications and associated end user data on mobile device secure elements; authenticate the respective end user and/or mobile device to the service provider to permit application personalization; activate applications with the respective service providers; perform transactions using the provisioned mobile device applications (e.g., a payment transaction at a retailer, etc.); initiate customer service requests (e.g., with the respective MNO, with service providers, with the TSM, with other third party entities, etc.); notify the respective MNO of a new mobile device and/or secure element; and alter end user settings associated with provisioned mobile device applications (e.g., change or reset a PIN, cancel a mobile device application, cancel an MNO relationship, etc.).

An OTA services gateway 135 and associated OTA services interface 123 are operable to facilitate provisioning of mobile device applications and associated end user data to end users' mobile devices 150. According to one embodiment, the OTA services gateway 135 may be configured to permit the TSM computer 110 to transact with third party OTA provisioning providers to perform all or some of the OTA provisioning services with mobile devices 150, such as by utilizing a common provisioning messaging standard for all third party OTA provisioning providers in a manner similar to that described with reference to the MNO interface 122 and service provider interface 121. According to another embodiment, the OTA services gateway 135 may be configured to permit the TSM computer 110 to provision mobile device applications and associated end user data directly to the mobile devices 150, such as via one or more carrier networks. According to various embodiments, the MNO gateway 134 and associated MNO interface 122 may be utilized at least in part to provide OTA provisioning by the TSM computer 110, such as for accessing and communicating over a respective MNO carrier network.

An end user registration gateway 136 and associated end user registration interface 124 are operable to facilitate communications with mobile device end users for registering to receive mobile device applications, requesting mobile device applications, updating status on mobile devices 150 and/or provisioned applications, and the like. According to one embodiment, service provider computers 160 and/or MNO computers 140 provide registration applications for end users (e.g., mobile device-based registration interface, Internet-based registration interface, etc.). Thus, the end user registration gateway 136 and associated end user registration interface 124 provide a common integration point and associated common messaging standard for receiving and responding to such requests in a manner similar to that described with reference to the MNO interface 122 and service provider interface 121. According to another embodiment, the TSM computer 110 may be configured to provide similar registration services to mobile device end users, such as may be performed on behalf of the service providers or MNOs. According to various embodiments, the MNO gateway 134 and associated MNO interface 122 may be utilized at least in part to provide end user registration functions by the TSM computer 110, such as for transmitting and receiving registration data over a respective MNO carrier network. According to various embodiments, the service provider gateway 133 and associated service provider interface 121 may be utilized at least in part to provide end user registration functions by the TSM computer 110, such as for end user authentication.

A third party integrator gateway 137 and associated third party integrator interface 125 are operable to facilitate communications with one or more third party integrators, such as may occur when sharing responsibilities or otherwise communicating with other TSMs. Much like that described with reference to the MNO interface 122, MNO gateway 134, service provider interface 121, and service provider gateway 133, the third party integrator gateway 137 and associated third party integrator interface 125 provide a common integration point and associated common messaging standard for communicating with any third party integrators.

Figure 3:
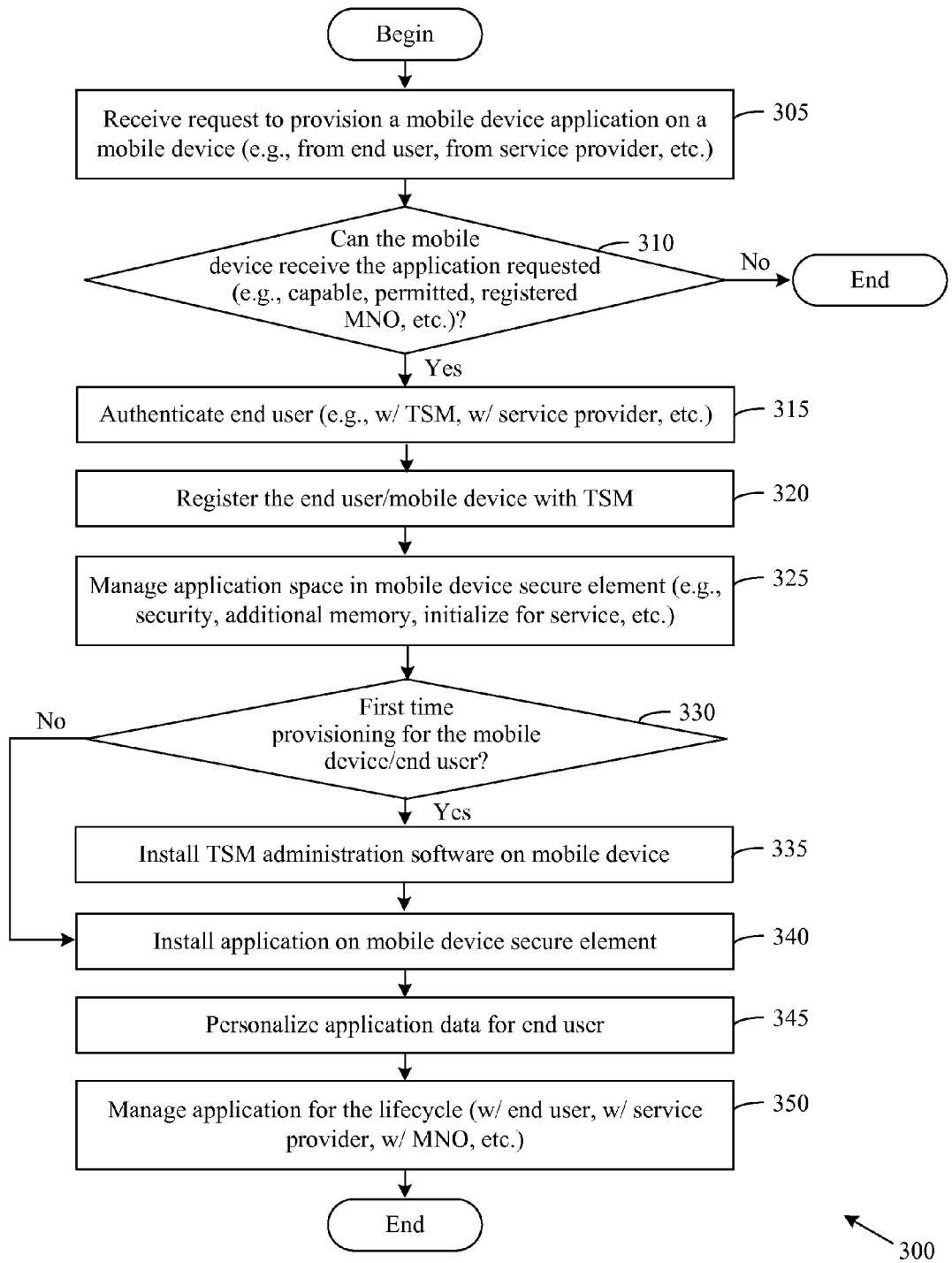
FIG. 3 illustrates a flow diagram of an example process for provisioning a mobile device application, according to an example embodiment of the invention.

With reference to FIG. 3, a flow diagram is provided illustrating an example method 300 for providing provisioning and integration services by a TSM computer 110, according to one embodiment. The method 300 is described also with reference to the block diagram 200 of FIG. 2.

By example only, the steps illustrated and described with reference to FIG. 3 can be performed to facilitate the provisioning of any mobile device application, such as a near field communication ("NFC") payment application provided by a payment service provider (e.g., card account issuer, financial institution, etc.). Thus, a mobile device user would request the installation of the NFC payment application on an associated mobile device from either the TSM or directly from a service provider providing the NFC payment application. The request ultimately would be transmitted to the TSM, such as via the end user registration gateway 136 and end user registration interface 124 if coming directly from the end user, or via the service provider gateway 133 and the service provider interface 121 if coming via a service provider. Upon receiving the request, the TSM computer then may verify whether the end user's mobile device is capable of receiving installs, whether a secure element associated with the end user's mobile device is adequately configured (e.g., can support an install, sufficient space, etc.). The TSM computer may then perform the necessary steps to prepare the end user's mobile device and associated secure element, either directly and/or via the end user's mobile network operator. In addition, the TSM may perform the various authentication measures to verify the end user, the end user's mobile device, and set up and personalize the NFC payment application for installation on the end user's secure element. After the NFC payment application is personalized and authentication and security measures are in place at the TSM computer, the NFC payment application may be provisioned to the end user's mobile device, such as via the OTA services gateway 135 and the OTA services interface 123 and/or via the MNO gateway 134 and the MNO interface 122 for interfacing with the end user's mobile network operator. After provisioning, the lifecycle of the NFC payment application for that end user may be managed via the TSM computer, such as via the lifecycle management application 127. Various services can be provided and/or otherwise facilitated by the TSM computer, such as handling service requests from the end user, the MNO, and the service provider; coordinating billing between the MNO and the service provider; facilitating updates to the application; and any other communications that may be required between the MNO, the service provider, the end user's mobile device, and/or the end user. It is appreciated that this description of provisioning and servicing an NFC payment application is provided for illustrative purposes, and the methods described with reference to FIG. 3 may be performed for any type of mobile device application between any of a number of parties.

The method 300 may begin at block 305, in which the TSM computer receives a request to provision a mobile device application on a mobile device. According to various embodiments, a provisioning request may come from any of the mobile devices 150 or associated end users, service provider computers 160, MNO computers 140, or associated websites or other network-routed requests. For example, a mobile device end user may transmit a registration request for a certain mobile device application as part of an end user communication 202, whereby the request is received via the end user registration gateway 136. In another example, a service provider registration request 204 is transmitted from a service provider to the end user registration gateway 136 according to a common service provider messaging standard, such as may occur when an end user requests an application via a service provider or when a new application version of a previously provisioned application is available. In yet another example, an MNO registration request 206 is transmitted from the MNO computer 140 to the end user registration gateway 136 according to a common MNO messaging standard, such as may occur if an MNO provides application registration and requests features on behalf of one or more service providers.

Following block 305, operations may continue at block 310. At decision block 310, a determination may be made as to whether the mobile device 150 is capable and/or is permitted to receive an OTA provisioned application. For example, it may be determined whether the mobile device is technically capable of receiving an OTA provisioned application or capable of operating the specific application requested, whether enough memory is available, etc., which may be obtained from the MNO computer 140 via the MNO gateway 134 utilizing MNO communications 208. In another example, it may be determined whether the mobile device and end user are permitted to receive the application requested, such as whether the end user's contract with the MNO or the service provider permits installation and/or use of the application, which may be obtained from the MNO computer 140 by MNO communications 208 sent via the MNO gateway 134 or from the service provider computer 160 by service provider communications 210 sent via the service provider gateway 133, respectively. It is appreciated that any other factor may be considered when determining whether the mobile device can receive the application at decision block 310, as may be desired.

If it is determined at block 310 that the mobile device cannot receive the mobile device application requested, then the method 300 may end. According to various embodiments, the TSM computer 110 may be configured to transmit a failure or status update to the mobile device, end user, MNO, service provider, and/or any other entity or individual. If, however, it is determined at block 310 that the mobile device may receive the mobile device application requested, then operations may continue at block 315.

At block 315, the TSM computer 110 may perform authentication processing of the end user and/or the end user's mobile device. For example, the identity of the mobile device end user may be verified as the correct end user for receiving the mobile device application and/or associated personalization data, and/or that the mobile device is in the correct end user's possession. According to one embodiment, the TSM computer 110 is operable to at least partially perform end user authentication, such as by receiving end user authentication data as part of an end user communication 202 and processing the end user authentication data against service provider provided authentication data and/or TSM stored authentication data. Though, according to other embodiments, the respective service provider can authenticate customers directly via the service provider computer 160. According to yet another embodiment, a combination of the TSM computer 110 and the service provider computer 160 may perform end user authentication, such as by receiving authentication data as part of the end user communication data 202 directly via the end user registration gateway 136, processing the authentication data in part by the TSM computer 110, and communicating authentication data and responses with the service provider computer 160 by the service provider communications 210 sent via the service provider gateway 133, according to the common service provider messaging standard. If it is determined that the end user is not authenticated, then the method 300 may terminate, or may re-attempt authentication.

If the end user is authenticated at block 315, then block 320 follows. At block 320, the end user and/or the mobile device is registered with the TSM, because it was previously determined at block 310 that the mobile device and/or the user has not yet received an application via the TSM. According to various embodiments, as part of the registration process, the TSM computer 110 may be configured to store unique identifiers of the mobile device, its secure element, and/or the end users for subsequent processing. For example, according to one embodiment, the TSM computer 110 may store a Mobile Subscriber Integrated Services Digital Network Number ("MSISDN"), an Integrated Circuit Card ID ("ICCID"), an International Mobile Subscriber Identity ("IMSI"), and/or card production life cycle ("CPLC") information to uniquely identify the end user and associated mobile device. According to other embodiments, however, any unique identifier may be used, such as may be provided by the end user or by the MNO.

Following block 320 is block 325, in which the TSM computer 110 facilitates the management of the application space on the mobile device secure element or other memory device associated with the mobile device. As part of this process, additional space may be provisioned via the MNO, secured keys may be provided (e.g., by the TSM or by the MNO), privileges associated with the secure element (or other memory device) may be added or changed, and/or the mobile device may be initialized for utilizing the mobile device application (e.g., initialized for NFC transactions, etc.). It is appreciated that various other steps may be performed as part of preparing the secure element for provisioning the requested application. According to various embodiments, some or all of these steps are initiated by the TSM computer 110 but performed at least in part by an MNO computer 140 communicating directly with the mobile device (e.g., via wireless communications over the respective carrier network, via Internet-based communications, etc.). Though, according to other embodiments, the TSM computer 110 and the associated secure element preparation module 126 and/or OTA provisioning module 130 are operable to facilitate preparing and managing the application space on the mobile device secure element at block 325 via OTA communications 212 from the TSM computer 110 to the mobile device 150 via the OTA services gateway 135 (which, according to various embodiments, may also utilize the MNO gateway 134).

Following block 325 is decision block 330, in which a determination may be made as to whether the mobile device and/or end user associated with the mobile device has previously received a mobile device application via the TSM computer 110. If the TSM computer 110 has previously provisioned an application on the mobile device, then it may be assumed that the end user and/or mobile device is registered with the TSM, has TSM administration software installed, and is capable of OTA application installations. However, if the mobile device has not yet participated in OTA provisioning via the TSM computer, then additional steps may be performed to validate the capabilities and permissions to receive the application. If it is determined at block 330 that the mobile device and/or the end user has previously received a mobile device application via the TSM computer, then operations may continue at block 340 described below.

If, however, it is determined at block 330 that the mobile device and/or the end user has not previously received a mobile device application via the TSM computer, then operations may continue at block 335, and the TSM computer 110 may install TSM administration software on the mobile device 150 that may be utilized to provide secured access to secure elements and further facilitate installing, accessing, and operating TSM-provisioned applications. The TSM computer 110 may install the TSM administration software on the mobile device also by OTA communications 212 sent via the OTA services gateway 135. It is appreciated that, according to another embodiment, a third party OTA provisioning provider may perform some or all of the application installation functions. In another embodiment, the MNO may generate and/or provide TSM administration software capable of accessing and operating TSM-provisioned applications. In one embodiment, the TSM administration software may be utilized to install, access, and operate all mobile device applications provided by all service providers. Though, in another embodiment, multiple administration software applications may be required, such as may occur when certain service provider applications require specialized administration software.

Following block 335 is block 340, in which the requested application may be installed on the secure element (or other memory device) of the mobile device 150. According to one embodiment, the requested application is installed by the TSM computer 110 by communicating directly with the mobile device via the OTA services interface 123 by transmitting application data in the OTA messaging according to the standard required by the specific secure element, mobile device, and/or carrier network technology, such as via Wireless Application Protocol ("WAP"), Short Messaging Service ("SMS"), Multimedia Messaging Service ("MMS"), etc. It is appreciated that, while each of the gateways and associated interfaces described herein are designed to promote a common integration point and common messaging standards to simplify integration and system flexibility, various mobile devices and carrier networks may operate according to a number of wireless technologies, each of which may cause application provisioning processing to be performed differently according to each of the various wireless network technologies. According to another embodiment, however, instead of the TSM computer 110 provisioning the requested application, a third party OTA provisioning provider may perform some or all of the application installation functions. According to this embodiment, the OTA services gateway 135 and associated OTA services interface 123 can be configured to implement a common provisioning messaging standard for communicating with each of the possible third party OTA provisioning providers.

Following block 340 is block 345, in which personalization data associated with the requested mobile device application may be prepared and transmitted to the mobile device. According to one embodiment, personalization data may be generated by the TSM computer 110 from data supplied by the service provider computer 160 via service provider communications 210 in the common service provider messaging format. According to other embodiments, personalization data may be created by the TSM computer 110 based on stored data, or created by a third party entity for providing personalization data. The format and content of personalization data can vary, depending on the mobile device application to be provisioned. Moreover, it is further appreciated that, according to another embodiment, the personalization application data or other associated end user data can be transmitted at or near the same time as the application is provisioned on the mobile device at block 340.

Following block 345 is block 350, in which the TSM computer 110 is operable to manage the provisioned application during its lifetime as installed on the secure element associated with the mobile device 150. For example, as an application is installed at block 340, the TSM computer 110 may be operable to record application installation status, including successes and failures, as may be provided by the lifecycle management module 127. The TSM computer 110 and associated lifecycle management module 127 may thus be configured to track statuses associated with the provisioned application, such as may be utilized to respond to various service provider or MNO requests, to provide periodic updates to service providers and/or MNOs, or to facilitate billing and payment functions. Application status messages can be transmitted as MNO communications 208 via the MNO gateway 134 and/or as service provider communications 210 via the service provider gateway 133, each according to the common MNO and service provider messaging standards, respectively.

In one example, in response to a request from a service provider computer 160 regarding a specific end user (e.g., as identified by name, account, or other unique identifier), the TSM computer 110 is operable to identify the end user as having a TSM-provisioned application installed. The TSM computer 110 may identify the end user by a secure element identifier (e.g., the ICCID, IMSI, etc. associated with the secure element). The mobile phone number (i.e., MSISDN) may be used as a secondary identifier of the end user. Upon identifying the end user, the TSM computer may perform one or more of, but not be limited to, the following functions when managing the application lifecycle: check the application state on an end user mobile device and/or secure element; update an application version on an end user mobile device and/or secure element; lock or unlock an application on an end user mobile device or secure element; remove an application from an end user mobile device or secure element; process a request indicating that the mobile device and/or secure element is lost or stolen; update a customer phone number and mobile device; update a secure element identity (e.g., ICCID); update an end user's authentication data; process an MNO subscriber cancellation; process a service provider end user cancellation; process application service messages; send an end user and/or mobile device MNO or service provider messages; or lock or unlock one or more of the provisioned applications.

The method 300 may end after block 350, having facilitated the provisioning of mobile device applications and integrating multiple service providers with multiple MNOs and their registered mobile devices, by providing a trusted service manager that promotes simplified integration via common gateways and interfaces implementing common messaging standards.

Figure 4:
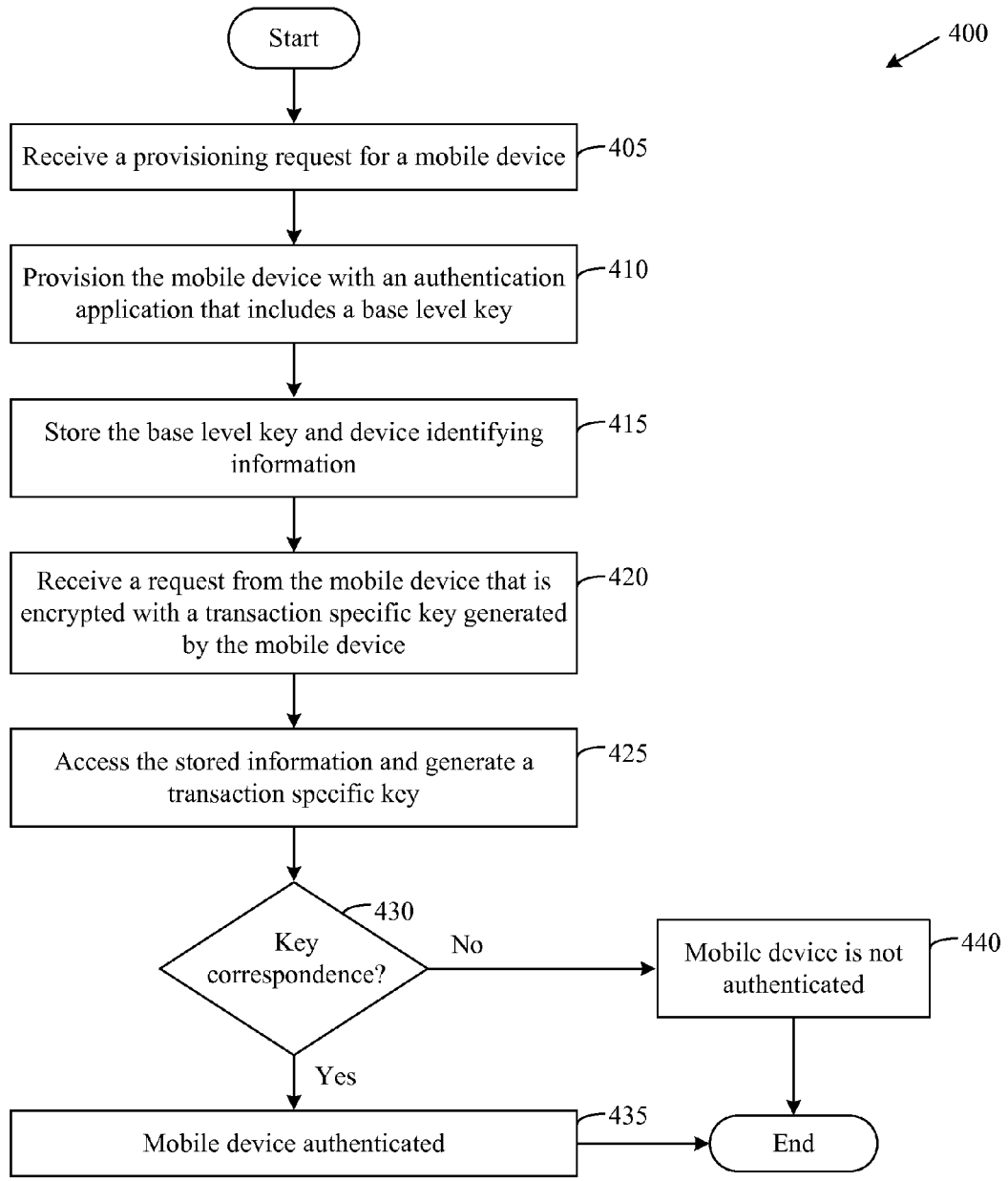
FIG. 4 illustrates a flow diagram of an example process for authenticating a mobile device, according to an example embodiment of the invention.

According to an aspect of the invention, methods for authenticating mobile devices and/or mobile device communications may be provided. In certain embodiments, transaction specific keys may be utilized to authenticate mobile devices and/or to encrypt and decrypt mobile device communications. FIG. 4 illustrates a flow diagram of an example method 400 for authenticating a mobile device, according to an example embodiment of the invention. The method 400 may be performed by a suitable trusted service management system, such as the system 100 illustrated in FIG. 1. The method 400 may begin at block 405.

At block 405, a provisioning request may be received for a mobile device, such as one of the mobile devices 150 illustrated in FIG. 1. As explained in greater detail above with reference to FIG. 3, a provisioning request may be received via a wide variety of suitable methods and/or via any number of intermediary devices and/or networks. In certain embodiments of the invention, the provisioning request may include a request to provision the mobile device 150 with an authentication application that may be utilized to generate transaction specific keys. For example, during a registration of the mobile device 150 with a TSM computer, such as the TSM computer 110 illustrated in FIG. 1, a provisioning request may be received. As another example, a provisioning request may be received for another application, such as a payment application, and a determination may be made to provision the mobile device 150 with an authentication application.

According to an aspect of the invention, mobile device identification information may be received in conjunction with a provisioning request and/or during a communications session established in association with a provisioning request. A wide variety of mobile device identification information may be received as desired in various embodiments of the invention, such as card production life cycle ("CPLC") information and/or identifying information associated with a secure element (e.g., the ICCID, IMSI, etc.). CPLC information may include variable length data associated with any integrated circuit ("IC") incorporated into the mobile device 150, such as a secure element chip and/or a subscriber identity module ("SIM") card. A wide variety of information may be included in CPLC data including, but not limited to, an identifier of an IC fabricator, an IC type, an operating system identifier, an operating system release date, an operating system release level, an IC fabrication date, an IC serial number, an IC batch identifier, an IC module fabricator, an IC module packaging date, an IC manufacturer, an IC embedding date, an IC pre-personalizer identification, an IC pre-personalizer equipment date, an IC pre-personalizer equipment identifier, an IC personalizer identifier, an IC personalization date, and/or an IC personalization equipment identifier. In certain embodiments, CPLC data may be provided by a chip and/or a mobile device as a tag or data string.

At block 410, the mobile device 150 may be provisioned with an authentication application and a base level key. For example, an authentication application may be driven to the mobile device 150 during an OTA provisioning process. In certain embodiments, the authentication application may be stored on a secure element associated with the mobile device 150. In certain embodiments, the base level key may be included in provisioning information for the authentication application. In other embodiments, the base level key may be provided to the mobile device 150 in a separate communication. The base level key, which may also be referred to as a base derivation key or a super-secret key, may include any suitable key that may be utilized to facilitate the derivation of transaction specific keys. For example, the base level key may be a key associated with the manufacturer of the mobile device 150. As another example, the base level key may be a device specific key that is provided to the mobile device 150.

The authentication application may utilize the base level key to generate or derive any number of transaction specific keys that may be utilized by the authentication application to encrypt and/or decrypt communications. In certain embodiments, the authentication application may utilize the base level key and a wide variety of other information, such as a portion of the device identification information, to derive or generate an intermediary key. For example, the base level key and device identification information may be added together, multiplied together, hashed together, or otherwise combined to derive an intermediary key. The intermediary key may then be provided to a DUKPT process to generate a plurality of transaction specific keys. During a subsequent communication (e.g., a transaction request, etc.), the authentication application may select a transaction specific key and utilize the selected transaction specific key to encrypt information included in the communication, such as a payload of a communication. Additionally, the authentication application may add an identifier of the transaction specific key and/or a device identifier to the communication prior to the output or transmission of the communication.

Following the provisioning of an authentication application to the mobile device 150 at block 410, operations may continue at block 415. At block 415, the base level key provided to the device and at least a portion of the received device identification information may be stored. For example, the base level key and the device identification information may be stored in one or more databases associated with the TSM computer 110, such as the databases 138 illustrated in FIG. 1. As desired, the information may be stored in association with any suitable mobile device identifier, such as a telephone number associated with the mobile device 150. In this regard, the stored information may be subsequently accessed to authenticate the mobile device 150.

At block 420, a request or other communication may be received from the mobile device 150. For example, a request to complete a payment transaction, a request to activate or provision a payment account, or any other suitable request may be received from the mobile device. In accordance with an aspect of the invention, the request or communication may be encrypted with a transaction specific key generated by the authentication application that has been provisioned onto the mobile device 150. Additionally, in certain embodiments, the request or communication may include an identifier of the mobile device and/or an identifier of the transaction specific key that was utilized.

At block 425, the stored device identification information (e.g., stored CPLC information, etc.) and/or the stored base level key may be accessed. For example, a device identifier included in the received request or communication may be utilized to access a database that includes stored device identification information and/or the stored base level key. Once the stored information is accessed, at least a portion of the stored information may be utilized to generate any number of transaction specific keys. For example, transaction specific keys may be generated in the same manner as that utilized by the mobile device 150. As one example, device identification information may be combined with a base level key to derive an intermediary key that is provided to a DUKPT process to generate any number of transaction specific keys. Accordingly, transaction specific keys may be independently generated by the TSM computer 110 and the mobile device 150. As an alternative to accessing stored information and generating transaction specific keys, the transaction specific keys may be generated prior to receiving the request, and any number of stored transaction specific keys may be accessed from memory.

In certain embodiments, an identifier of the transaction specific key utilized by the mobile device 150 may be utilized to select an appropriate transaction specific key generated by the TSM computer 110. For example, the received request may include an indication that the fourth derived key was utilized by the mobile device 150. Accordingly, the TSM computer 110 may select the fourth derived key as an appropriate key for decrypting the request or communication.

At block 430, a determination may be made as to whether a correspondence exists between the transaction specific key utilized by the mobile device 150 and the transaction specific key generated by and/or selected by the TSM computer 110. For example, a determination may be made as to whether the transaction specific key utilized by the TSM computer 110 facilitates the decryption of the received request or communication. If it is determined at block 430 that a key correspondence exists, then operations may continue at block 435, and the mobile device 150 may be authenticated. As desired, the request received from the mobile device 150 may be processed by the TSM computer 110. For example, a payment request may be processed and/or forwarded to a payment service provider. If, however, it is determined at block 430 that no key correspondence exists, then operations may continue at block 440, and the mobile device 150 may not be authenticated. As desired, any number of suitable alerts may be generated to indicate the failure to authenticate the mobile device. Additionally, alert messages and/or error messages may be communicated to the mobile device 150 and/or any number of other entities.

The method 400 may end following either block 435 or block 440.

Figure 5:
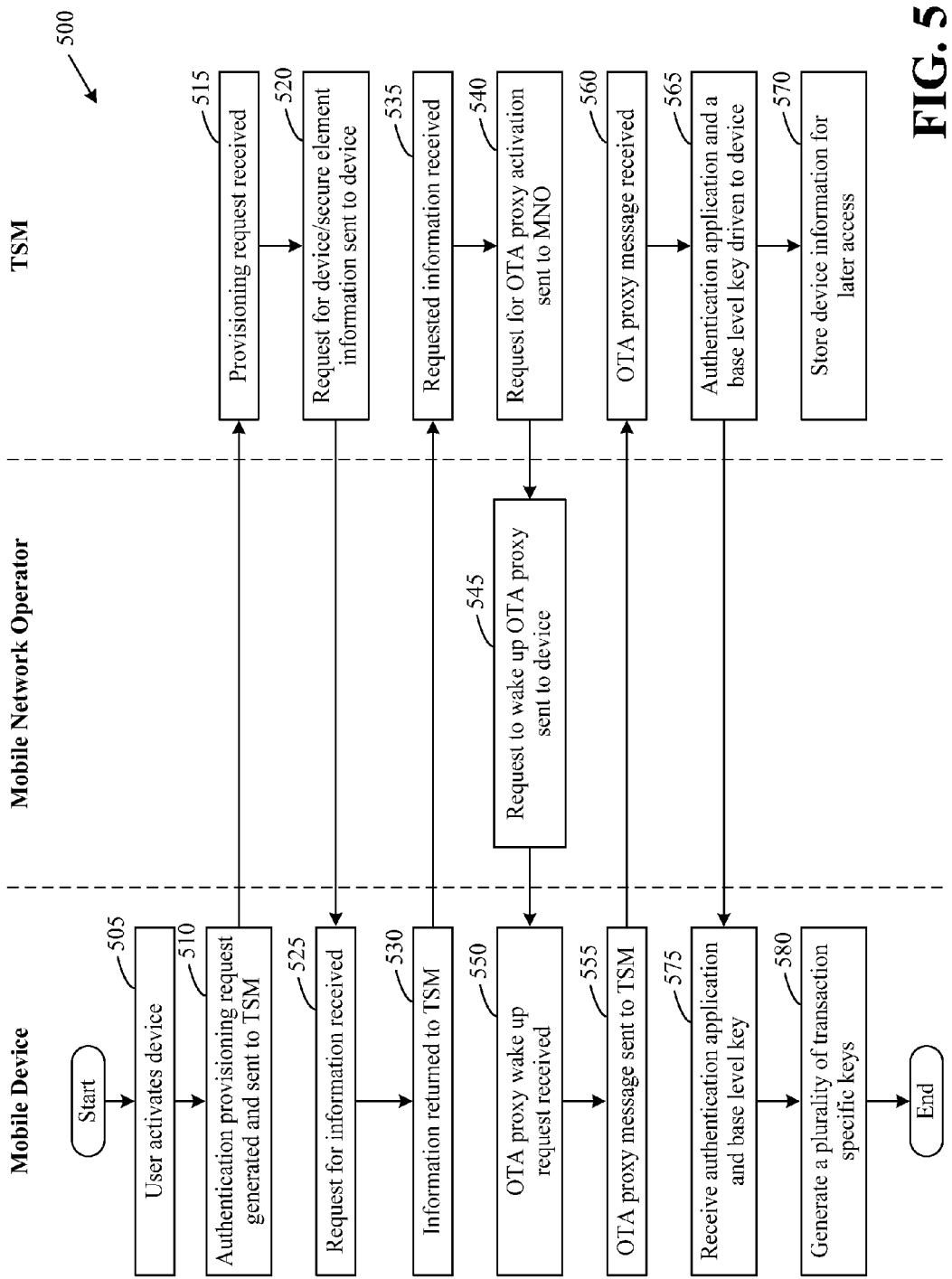
FIG. 5 illustrates a flow diagram of an example process for providing an authentication application to a mobile device, according to an example embodiment of the invention.

FIG. 5 illustrates a flow diagram of an example method 500 for providing an authentication application to a mobile device, according to an example embodiment of the invention. The method 500 may be one example of the operations that may be performed at blocks 405-415 illustrated in the method 400 of FIG. 4. As such, the method 500 may be performed by a suitable trusted service management system, such as the system 100 illustrated in FIG. 1. The method 500 may begin at block 505.

At block 505, a user may activate a mobile device, such as one of the mobile devices 150 illustrated in FIG. 1. In certain embodiments, the activation of the mobile device 150 may be an initial activation of the mobile device 150. In other embodiments, the activation of the mobile device 150 may be an activation following a software update to the mobile device 150 by an MNO, such as the MNO computer 140 illustrated in FIG. 1. Based upon an activation of the mobile device 150, the mobile device 150 may attempt to establish contact with a TSM computer, such as the TSM computer 110 illustrated in FIG. 1. In this regard, a secure element associated with the mobile device 150 may be provisioned and/or personalized.

At block 510, an authentication provisioning request may be generated by the mobile device 150 and output for communication to the TSM computer 110. For example, a request for the provisioning of an authentication application may be generated and output. In certain embodiments, the request may be generated during an enrollment process of the mobile device 150 with the TSM computer 110. In other embodiments, the request may be generated during a setup process for the secure element.

The request may be received by the TSM computer 110 at block 515. As desired in various embodiments, any number of suitable networks and/or communications techniques may be utilized to facilitate the communication of the request to the TSM computer 110. For example, the request may be communicated via a suitable carrier network, such as one of the carrier networks 180 illustrated in FIG. 1. In certain embodiments, the request may be communicated directly to the TSM computer 110. In other embodiments, the request may be communicated through any number of intermediary systems and/or devices, such as an MNO computer 140. In certain embodiments, a secure communications channel may be established between the mobile device 150 and the TSM computer 110 either prior to the communication of the authentication provisioning request or as a result of the communication.

At block 520, the TSM computer 110 may generate a request for device identification information, such as CPLC information and/or secure element identification information, and the generated request may be communicated to the mobile device 150. A wide variety of different types of device identification information may be requested as desired in various embodiments of the invention. At block 525, the request for device identification information may be received and processed by the mobile device 150. The requested information may then be communicated by the mobile device 150 to the TSM computer 110 at block 530, and the TSM computer 110 may receive the requested information at block 535. As an alternative to the TSM computer 110 requesting device identification information, device identification information may be included in the initial authentication provisioning request.

As desired, the TSM computer 110 may perform any number of suitable authentication procedures utilizing the device identification information. For example, as explained in greater detail above with reference to FIG. 3, the TSM computer 110 may determine whether the mobile device 150 is a valid device that is capable of and/or that is authorized to receive an authentication application. In certain embodiments, the TSM computer 110 may verify device identification information against information received from a device manufacturer and/or an MNO computer 140. In the event that the TSM computer 110 determines that the mobile device 150 is not capable of and/or authorized to receive an authentication application, the TSM computer 110 may communicate an appropriate error message to the mobile device 150. Otherwise, operations may continue at block 540.

At block 540, the TSM computer 110 may request an MNO computer 140 associated with the mobile device 150 to activate or wake up an OTA proxy or OTA proxy application associated with the mobile device 150. For example, the MNO computer 140 may be requested to wake up an OTA proxy that is stored on a general or shared memory or general operation chip associated with the mobile device 150. The OTA proxy activation request may be received by the MNO computer 140 at block 545, and the MNO computer 140 may communicate an appropriate OTA proxy wake up request to the mobile device 150. The OTA proxy wake up request may be received by the mobile device 150 at block 550, and a suitable OTA application associated with the mobile device 150 may communicate an OTA proxy message to the TSM computer 110 at block 555. The OTA proxy message may be received by the TSM computer 110 at block 560, and an OTA communications session may be established between the mobile device 150 and the TSM computer 110.

At block 565, an authentication application and a base level key may be driven to the mobile device 150 by the TSM computer 110. In other words, the mobile device 150 may be provisioned with the authentication application. Additionally, at block 570, at least a portion of the received device identification information may be stored for subsequent access by the TSM computer 110 during device authentication. As explained in greater detail below with reference to FIG. 6, the device identification information may be utilized in conjunction with the base level key to generate any number of transaction specific keys. The transaction specific keys may be utilized to decrypt communications received from the mobile device 150 and/or to encrypt communications transmitted to the mobile device 150.

The authentication application and the base level key may be received by the mobile device 150 at block 575. In certain embodiments, the authentication application may be stored on or provisioned to a secure element associated with the mobile device 150. For example, a general purpose chip associated with the mobile device 150 may receive the authentication application via an established OTA session, and the general purpose chip may provide the received authentication application to the secure element. At block 580, the authentication application and the base level key may be utilized to generate a plurality of unique transaction specific keys. A wide variety of suitable processes and/or techniques may be utilized as desired to generate transaction specific keys. For example, device identification information may be combined with the base level key to generate an intermediary key. The intermediary key may then be provided to a DUKPT process executed by the authentication application in order to generate a plurality of transaction specific keys. The process of deriving an intermediary key and providing the intermediary key to a DUKPT process is described by way of example only. A wide variety of other suitable techniques may be utilized as desired to generate or derive transaction specific keys.

The method 500 may end following block 580.

Figure 6:
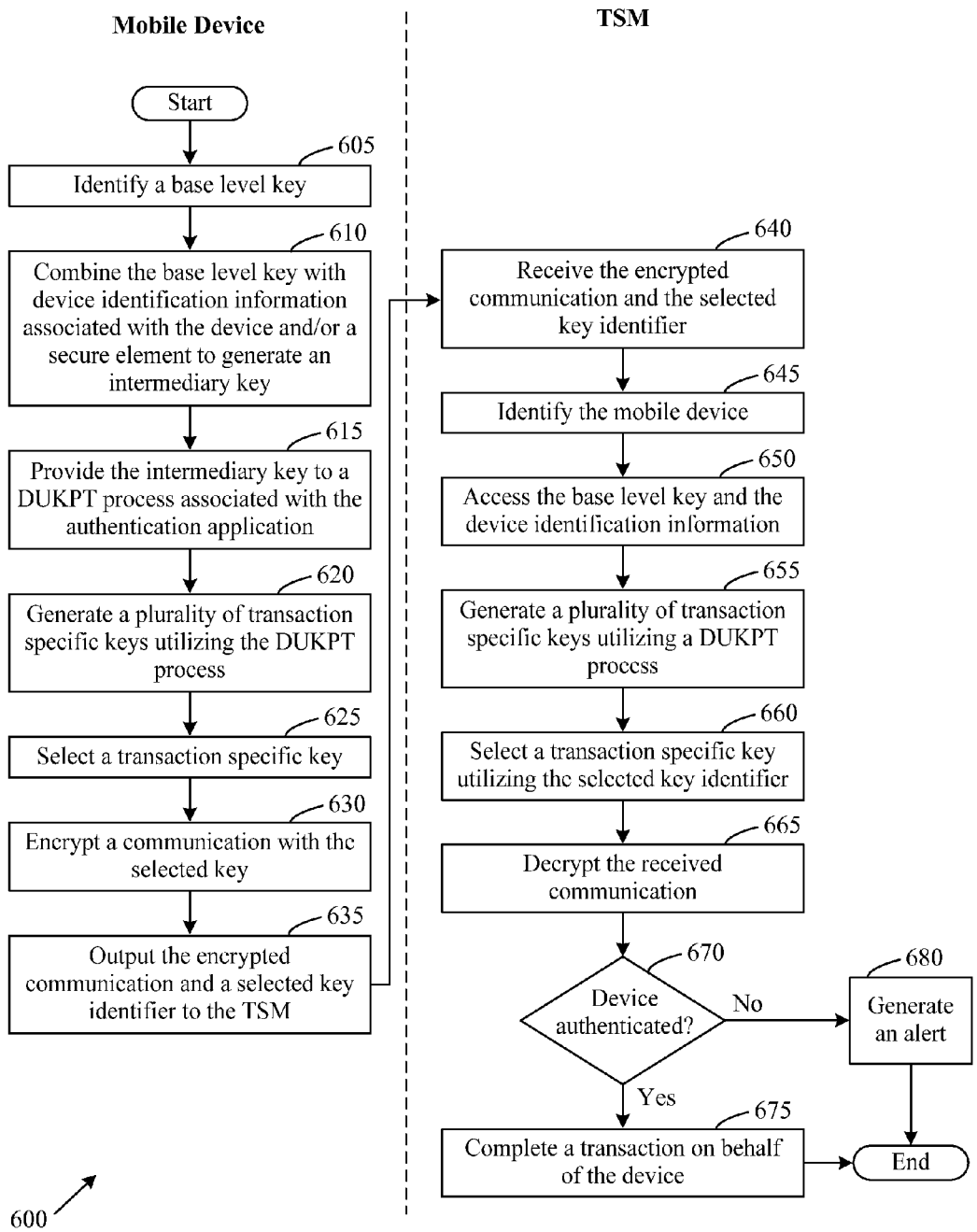
FIG. 6 illustrates a flow diagram of an example process for authenticating a mobile device utilizing a transaction specific key, according to an example embodiment of the invention.

FIG. 6 illustrates a flow diagram of an example method 600 for authenticating a mobile device utilizing a transaction specific key, according to an example embodiment of the invention. The method 600 may be one example of the operations that may be performed at blocks 420-440 illustrated in the method 400 of FIG. 4. As such, the method 600 may be performed by a suitable trusted service management system, such as the system 100 illustrated in FIG. 1. The method 600 may begin at block 605.

At block 605, a base level key, such as a base level key received in association with an authentication application, may be identified by a mobile device 150. For example, an authentication application stored and executed on a secure element of the mobile device 150 may identify a received base level key. At block 610, the base level key may be combined with device identification information associated with the mobile device 150 in order to generate or derive an intermediary key. A wide variety of device identification information may be utilized as desired to derive an intermediary key, such as CPLC data associated with the mobile device 150 and/or a secure element and/or a wide variety of secure element identifiers. Additionally, a wide variety of suitable methods and/or techniques, such as addition, multiplication, division, hashing, and/or modulo operations, may be utilized to combine device identification information with the base level key. According to an aspect of the invention, the device identification information that is utilized may be device identification information that has previously been provided to a TSM computer, such as the TSM computer 110 illustrated in FIG. 1.

At block 615, the derived intermediary key may be provided to a DUKPT process associated with the authentication application. The DUKPT process may utilize the intermediary key to generate a plurality of transaction specific keys at block 620. Each of the transaction specific keys may be a unique key that facilitates the encryption and/or decryption of a communication or message.

At block 625, a transaction specific key may be selected by the authentication application. In certain embodiments, a next unused transaction specific key may be selected. In other embodiments, a randomization algorithm or other suitable method may be utilized to select an available transaction specific key from a plurality of transaction specific keys. The selected transaction specific key may be utilized by the authentication application at block 630 to encrypt a communication or message, such as a transaction request or other secure message. A wide variety of suitable encryption methods and/or techniques may be utilized by the authentication application to encrypt the communication or message. Suitable encryption methods will be appreciated by those of ordinary skill in the art. The transaction specific key may be the key or secret for decrypting the encrypted communication.

At block 635, the encrypted communication may be output by the mobile device 150 for communication to the TSM computer 110. In this regard, the TSM computer 110 may authenticate the mobile device 150. In certain embodiments, an identifier of the transaction specific key may be included in the communication and/or separately communicated to the TSM computer 110. For example, a number or other identifier associated with the available keys (e.g., the next key, the second available key, the fourth available key, etc.) may be communicated to the TSM computer 110. As a result of communicating an identifier of the transaction specific key, the transaction specific key itself will not be communicated. Accordingly, security may be enhanced.

At block 640, the encrypted communication and the selected transaction specific key identifier may be received by the TSM computer 110. In certain embodiments, the communication and identifier may be received directly from the mobile device 150. In other embodiments, the communication and identifier may be received from any number of intermediary systems and/or devices, such as an MNO computer 140.

At block 645, the TSM computer 110 may identify the mobile device 150. For example, an identifier included in the communication or in information associated with an established communication session with the mobile device 150 (e.g., header information etc.) may be utilized to identify the mobile device 150. Examples of suitable information that may be utilized to identify the mobile device 150 include, but are not limited to, a telephone number associated with the mobile device 150, a device serial number, a chip serial number, a secure element identifier, etc. In certain embodiments, the information utilized to identify the mobile device 150 may be distinct from the device identification information utilized in the derivation of the transaction specific key.

Once the mobile device 150 has been identified, operations may continue at block 650. At block 650, stored device identification information, such as device identification information received during the provisioning of the authentication application, may be accessed. Additionally, a stored base level key may be accessed. According to an aspect of the invention, the accessed device identification information may be the same information utilized by the mobile device 150 to derive the transaction specific key.

At block 655, the TSM computer 110 may generate or derive a plurality of transaction specific keys in a similar manner as that utilized by the mobile device 150. For example, the base level key may be combined with the accessed device identification information to derive an intermediary key. The intermediary key may then be provided to a DUKPT process to generate a plurality of transaction specific keys. As an alternative to generating transaction specific keys based upon the receipt of an encrypted communication, the transaction specific keys may be generated and stored prior to the receipt of the communication. One or more of the generated transaction specific keys may then be accessed from memory.

At block 660, a transaction specific key generated by the TSM computer 110 may be selected. For example, the key identifier received from the mobile device 150 may be utilized to select an appropriate transaction specific key generated by the TSM computer 110. The selected transaction specific key may then be utilized at block 665 to decrypt the encrypted portions of the received communication or message. Based at least in part upon an attempted decryption, a determination may be made at block 670 as to whether the mobile device 150 is authenticated. For example, a determination may be made as to whether the transaction specific key generated by the TSM computer 110 is a suitable transaction specific key that may be utilized to decrypt the communication.

If it is determined at block 670 that the mobile device 150 is authenticated, then operations may continue at block 675, and the TSM computer 110 may further process the received communication. A wide variety of operations may be utilized to further process the received communication. For example, if the communication includes a request to complete a payment transaction, then the TSM computer 110 may complete the payment transaction or direct a suitable payment service provider to complete or process the payment transaction. In this regard, the mobile device 150 may be utilized to complete credit transactions, debit transactions, and/or other payment transactions in a relatively secure manner. As another example, if the communication includes a request to establish a secure communications session (e.g., an SSL handshake, etc.), then the communications session may be established by the TSM computer 110. Other types of communications and/or communications processing will be apparent to those of ordinary skill in the art.

If, however, it is determined at block 670 that the mobile device 150 is not authenticated, then operations may continue at block 680. At block 680, any number of control actions may be taken by the TSM computer 110 based upon a failure to authenticate the mobile device 150. For example, a request included in the communication (e.g., a payment request, etc.) may be denied by the TSM computer 110. In certain embodiments, a suitable error or failure message may be returned to the mobile device 150. As desired, any number of alerts may be generated by the TSM computer 110. For example, an alert indicating a potential breach in security or compromising of a secure element or secure communication may be generated. Generated alerts may then be communicated to any number of recipients (e.g., an MNO, a mobile device, a customer email account, a payment service provider, etc.) and/or displayed to TSM personnel for processing.

As desired, both the mobile device 150 and/or the TSM computer 110 may generate additional transaction specific keys at any point in time. For example, when available transaction specific keys have been exhausted, a DUKPT process may be utilized to generate additional transaction specific keys. Additionally, in certain embodiments, a new base level key may be communicated to the mobile device 150 either periodically or upon the identification of a predetermined event, such as compromising of the mobile device 150 and/or an update of the authentication application. Similarly, updated or modified mobile device identification information may be communicated by the mobile device 150 to the TSM computer 110 at any point in time.

The method 600 may end following either block 675 or block 680.

The operations described and shown in the methods 300, 400, 500, and 600 of FIGS. 3-6 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 3-6 may be performed.

As a result of the mobile device and TSM separately generating unique transaction specific keys, the security of mobile device transactions and/or other communications may be enhanced. Additionally, improved authentication of mobile devices may be provided. In certain embodiments of the invention, the authentication of mobile devices may be provided by a TSM acting on the behalf of any number of service providers. In other embodiments of the invention, device identification information may be provided to a service provider (e.g., a payment service provider, a payment account activation service provider, etc.) by the TSM, and the service provider may facilitate the authentication of a mobile device. Alternatively, an MNO may authenticate a mobile device.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

Various block and/or flow diagrams of systems, methods, apparatus, and/or computer program products according to example embodiments of the invention are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The claimed invention is:

1. A computer-implemented method for authenticating mobile devices, the method comprising:

receiving, from a mobile device, device identifying information stored in a secure element included in a memory of the mobile device;

provisioning the mobile device with a near field communication (NFC) payment application configured to derive unique transaction specific keys, the provisioning comprising:

receiving a provisioning request from the mobile device to provision the NFC payment application on the mobile device;

determining the mobile device is capable of receiving the NFC payment application based on determining an amount of memory required for provisioning the NFC payment application and additional space for key storage is available in the secure element included in the memory of the mobile device; and installing the NFC payment application in the secure element included in the memory of the mobile device;

communicating, to the mobile device during the provisioning of the NFC payment application, a base level key utilized by the NFC payment application to derive unique transaction specific keys to encrypt subsequent communications output by the mobile device;

receiving, from the mobile device, a communication encrypted with a unique transaction specific key;

generating, based at least in part upon the device identifying information and the base level key, a derived key by combining the base level key with at least a portion of the device identifying information to derive an intermediary key used to generate the derived key; and utilizing the derived key to decrypt the received communication and authenticate the mobile device, wherein the above operations are performed by one or more computers associated with a service provider.

2. The computer-implemented method of claim 1, further comprising:

receiving, from the mobile device, an identifier associated with the unique transaction specific key; and utilizing the received identifier to identify the derived key.

3. The computer-implemented method of claim 1, wherein generating a derived key comprises generating a derived key utilizing a derived unique key per transaction (DUKPT) process.

4. The computer-implemented method of claim 3, wherein generating a derived key comprises:

providing the intermediary key to the DUKPT process to generate the derived key.

5. The computer-implemented method of claim 1, wherein receiving device identifying information comprises receiving a card product life cycle (CPLC) for the device.

6. The computer-implemented method of claim 1, further comprising:

storing the received device identifying information.

7. The computer-implemented method of claim 1, wherein receiving a communication encrypted with a unique transaction specific key comprises receiving a communication during a secure socket layer (SSL) handshake with the mobile device.

8. A system for authenticating mobile devices, the system comprising:

at least one memory configured to store computer-executable instructions; and at least one processor configured to access the at least one memory and execute the computer-executable instructions to:

receive, from a mobile device, device identifying information stored in a secure element included in a memory of the mobile device;

provision the mobile device with a near field communication (NFC) payment application configured to derive unique transaction specific keys, the provisioning comprising:

receiving a provisioning request from the mobile device to provision the NFC payment application on the mobile device;

determining the mobile device is capable of receiving the NFC payment application based on determining an amount of memory required for provisioning the NFC payment application and additional space for key storage is available in the secure element included in the memory of the mobile device; and installing the NFC payment application in the secure element included in the memory of the mobile device;

direct communication, to the mobile device during the provisioning of the NFC payment application, of a base level key utilized by the NFC payment application to derive unique transaction specific keys to encrypt subsequent communications output by the mobile device;

receive, from the mobile device, a communication encrypted with a unique transaction specific key;

generate, based at least in part upon the device identifying information and the base level key, a derived key by combining the base level key with at least a portion of the device identifying information to derive an intermediary key used to generate the derived key; and utilize the derived key to decrypt the received communication and authenticate the mobile device.

9. The system of claim 8, wherein the at least one processor is further configured to execute the computer-executable instructions to:

receive, from the mobile device, an identifier associated with the unique transaction specific key; and utilize the received identifier to identify the derived key.

10. The system of claim 8, wherein the derived key is generated utilizing a derived unique key per transaction (DUKPT) process.

11. The system of claim 10, wherein the at least one processor is further configured to execute the computer-executable instructions to:

provide the intermediary key to the DUKPT process to generate the derived key.

12. The system of claim 8, wherein the received device identifying information comprises a card product life cycle (CPLC) for the device.

13. The system of claim 8, wherein the at least one processor is further configured to execute the computer-executable instructions to:

direct storage of the received device identifying information.

14. The system of claim 8, wherein the communication encrypted with a unique transaction specific key is received during a secure socket layer (SSL) handshake with the mobile device.

15. A computer-implemented method for authenticating a mobile device, the method comprising:

communicating, by a mobile device to a service provider, device identifying information stored in a secure element included in a memory of the mobile device;

provisioning, by the service provider, the mobile device with a near field communication (NFC) payment application configured to derive unique transaction specific keys, the provisioning comprising:

receiving a provisioning request from the mobile device to provision the NFC payment application on the mobile device;

determining the mobile device is capable of receiving the NFC payment application based on determining an amount of memory required for provisioning the NFC payment application and additional space for key storage is available in the secure element included in the memory of the mobile device; and installing the NFC payment application in the secure element included in the memory of the mobile device;

receiving, by the mobile device from the service provider during the provisioning of the NFC payment application, a base level key;

utilizing, by the NFC payment application, the base level key to derive a unique transaction specific key by combining the base level key with at least a portion of the device identifying information to derive an intermediary key used to generate the unique transaction specific key;

encrypting, by the mobile device utilizing the unique transaction specific key, a communication; and outputting, by the mobile device to the service provider, the encrypted communication, wherein the service provider utilizes the device identifying information and the base level key to generate a key to decrypt the communication and authenticate the mobile device.

16. The computer-implemented method of claim 15, further comprising:

communicating, from the mobile device to the service provider, an identifier associated with the unique transaction specific key, wherein the service provider utilizes the received identifier to identify the generated key utilized to decrypt the communication.

17. The computer-implemented method of claim 15, wherein deriving a unique transaction specific key comprises generating a unique transaction specific key utilizing a derived unique key per transaction (DUKPT) process.

18. The computer-implemented method of claim 17, wherein generating a unique transaction specific key comprises:

providing, by the mobile device, the intermediary key to the DUKPT process to generate the unique transaction specific key.

19. The computer-implemented method of claim 18, wherein combining the base level key with at least a portion of the device identifying information comprises combining the base level key with at least a portion of a card product life cycle (CPLC) for the device.

20. The computer-implemented method of claim 15, further comprising:

storing, by the mobile device, the base level key in a secure element associated with the mobile device.

21. The computer-implemented method of claim 15, wherein outputting the encrypted communication comprises outputting the encrypted communication during a secure socket layer (SSL) handshake between the mobile device and the service provider.

* * * * *